US011924930B2

(12) United States Patent
Wilke et al.

(10) Patent No.: US 11,924,930 B2
(45) Date of Patent: Mar. 5, 2024

(54) ARTICLE FOR USE WITH APPARATUS FOR HEATING SMOKABLE MATERIAL

(71) Applicant: BRITISH AMERICAN TOBACCO (INVESTMENTS) LIMITED, London (GB)

(72) Inventors: Andrew P. Wilke, Madison, WI (US); Duane A. Kaufman, Hollandale, WI (US); Raymond J. Robey, Madison, WI (US)

(73) Assignee: NICOVENTURES TRADING LIMITED, London (GB)

( * ) Notice: Subject to any disclaimer, the term of this patent is extended or adjusted under 35 U.S.C. 154(b) by 386 days.

(21) Appl. No.: 15/754,809

(22) PCT Filed: Aug. 26, 2016

(86) PCT No.: PCT/EP2016/070178
§ 371 (c)(1),
(2) Date: Feb. 23, 2018

(87) PCT Pub. No.: WO2017/036951
PCT Pub. Date: Mar. 9, 2017

(65) Prior Publication Data

US 2018/0235279 A1 Aug. 23, 2018

Related U.S. Application Data

(63) Continuation of application No. 14/840,703, filed on Aug. 31, 2015, now abandoned.

(51) Int. Cl.
*H05B 6/10* (2006.01)
*A24C 5/01* (2020.01)
(Continued)

(52) U.S. Cl.
CPC ................. *H05B 3/58* (2013.01); *A24C 5/01* (2020.01); *A24D 1/20* (2020.01); *A24F 40/465* (2020.01); *A24F 40/20* (2020.01); *H05B 6/10* (2013.01)

(58) Field of Classification Search
CPC ......... A24F 47/008; H05B 6/108; H05B 6/36; H05B 6/10
(Continued)

(56) References Cited

U.S. PATENT DOCUMENTS

| | | | |
|---|---|---|---|
| 219,628 | A | 9/1879 | Edison |
| 219,634 | A | 9/1879 | Gifford |

(Continued)

FOREIGN PATENT DOCUMENTS

| | | | |
|---|---|---|---|
| AT | 262137 | B | 5/1968 |
| AT | 306224 | B | 3/1973 |

(Continued)

OTHER PUBLICATIONS

Application and File History for U.S. Appl. No. 14/840,652, filed Aug. 31, 2015, inventors Blandino et al.

(Continued)

*Primary Examiner* — Eric S Stapleton
(74) *Attorney, Agent, or Firm* — Husch Blackwell LLP

(57) ABSTRACT

Disclosed is an article for use with apparatus for heating smokable material to volatilize at least one component of the smokable material. The article includes smokable material and a cover around the smokable material. The cover defines an outer surface of the article that may contact the apparatus in use, and includes heating material that is heatable by penetration with a varying magnetic field. A method of manufacturing such an article also is disclosed.

14 Claims, 3 Drawing Sheets

(51) Int. Cl.

| | |
|---|---|
| ***A24D 1/20*** | (2020.01) |
| ***A24F 40/465*** | (2020.01) |
| ***H05B 3/58*** | (2006.01) |
| *A24F 40/20* | (2020.01) |

(58) Field of Classification Search
USPC .......................................................... 392/386
See application file for complete search history.

(56) References Cited

U.S. PATENT DOCUMENTS 219,635 A 9/1879 Giles
219,643 A 9/1879 Mattoni
844,272 A 2/1907 Fate
912,986 A 2/1909 Aschenbrenner
1,071,817 A 9/1913 Stanley
1,771,366 A 7/1930 Wyss et al.
1,886,391 A 11/1932 Henri et al.
2,057,353 A 10/1936 Whittemore
2,104,266 A 1/1938 McCormick
2,462,563 A 2/1949 Seyforth et al.
2,473,325 A 6/1949 Aufiero
2,689,150 A 9/1954 Croce et al.
2,809,634 A 10/1957 Hirotada et al.
2,888,208 A 5/1959 Rene et al.
3,040,991 A 6/1962 Rene et al.
3,043,524 A 7/1962 Sonia et al.
3,111,396 A 11/1963 Ball
3,144,174 A * 8/1964 Abplanalp ............. B65D 83/72 222/146.2
3,225,954 A 12/1965 Herrick et al.
3,258,015 A 6/1966 Drummond et al.
3,265,236 A 8/1966 Norman et al.
3,289,949 A 12/1966 Willy et al.
3,347,231 A 10/1967 Chien-Hshuing et al.
3,402,724 A 9/1968 Blount et al.
3,431,393 A 3/1969 Katsuda et al.
3,433,632 A 3/1969 Elbert et al.
3,521,643 A 7/1970 Toth et al.
3,522,806 A 8/1970 Szekely et al.
3,604,428 A 9/1971 Moukaddem
3,647,143 A 3/1972 Gauthier et al.
3,658,059 A 4/1972 Steil et al.
3,733,010 A 5/1973 Riccio et al.
3,804,100 A 4/1974 Fariello
3,805,806 A 4/1974 Grihalva
3,856,185 A 12/1974 Riccio et al.
3,864,326 A 2/1975 Babington et al.
3,889,690 A 6/1975 Guarnieri
3,913,843 A 10/1975 Cambio, Jr. et al.
3,943,942 A 3/1976 Anderson et al.
3,964,902 A 6/1976 Fletcher
4,009,713 A 3/1977 Simmons et al.
4,017,701 A 4/1977 Mittelmann
4,031,906 A 6/1977 Knapp
4,094,119 A 6/1978 Sullivan
4,145,001 A 3/1979 Weyenberg et al.
4,149,548 A 4/1979 Bradshaw et al.
4,161,283 A 7/1979 Hyman
4,171,000 A 10/1979 Uhle
4,193,513 A 3/1980 Bull, Jr.
4,284,089 A 8/1981 Ray et al.
4,299,274 A 11/1981 Campbell et al.
4,299,355 A 11/1981 Haekkinen et al.
4,303,083 A 12/1981 Burruss, Jr.
4,303,541 A 12/1981 Wasel-Nielen et al.
4,393,884 A 7/1983 Jacobs
4,412,930 A 11/1983 Koike et al.
4,427,123 A 1/1984 Komeda et al.
4,429,835 A 2/1984 Brugger et al.
4,474,191 A 10/1984 Steiner
4,503,851 A 3/1985 Braunroth
4,588,976 A 5/1986 Jaselli
4,628,187 A 12/1986 Sekiguchi et al.
4,638,820 A 1/1987 Roberts et al.
4,675,508 A 6/1987 Miyaji et al.
4,676,237 A 6/1987 Wood et al.
4,677,992 A 7/1987 Bliznak
4,694,841 A 9/1987 Esparza
4,734,097 A 3/1988 Tanabe et al.
4,735,217 A 4/1988 Gerth et al.
4,746,067 A 5/1988 Svoboda
4,756,318 A 7/1988 Clearman et al.
4,765,347 A * 8/1988 Sensabaugh, Jr. ...... A24F 42/60 131/273
4,765,348 A 8/1988 Honeycutt
4,771,795 A 9/1988 White et al.
4,776,353 A 10/1988 Lilja et al.
4,819,665 A 4/1989 Roberts et al.
4,827,950 A 5/1989 Banerjee et al.
4,830,028 A 5/1989 Lawson et al.
4,848,374 A 7/1989 Chard et al.
4,885,129 A 12/1989 Leonard et al.
4,892,109 A 1/1990 Strubel
4,907,606 A 3/1990 Lilja et al.
4,913,168 A 4/1990 Potter et al.
4,917,119 A 4/1990 Potter et al.
4,917,120 A 4/1990 Hill
4,917,301 A 4/1990 Munteanu
4,922,901 A 5/1990 Brooks et al.
4,924,883 A 5/1990 Perfetti et al.
4,938,236 A 7/1990 Banerjee et al.
4,941,483 A 7/1990 Ridings et al.
4,945,929 A 8/1990 Egilmex
4,945,931 A 8/1990 Gori
4,947,874 A 8/1990 Brooks et al.
4,947,875 A 8/1990 Brooks et al.
4,955,399 A 9/1990 Potter et al.
4,978,814 A 12/1990 Honour
4,979,521 A * 12/1990 Davis ................... A24C 5/1892 131/84.1
4,987,291 A 1/1991 McGaffigan et al.
4,991,606 A 2/1991 Serrano et al.
5,019,122 A 5/1991 Clearman et al.
5,020,509 A 6/1991 Suzuki et al.
5,027,837 A 7/1991 Clearman et al.
5,040,551 A 8/1991 Schlatter et al.
5,040,552 A 8/1991 Schleich et al.
5,042,509 A 8/1991 Banerjee et al.
5,046,514 A 9/1991 Bolt
5,060,667 A 10/1991 Strubel
5,060,671 A 10/1991 Counts et al.
5,076,292 A 12/1991 Sensabaugh, Jr. et al.
5,080,115 A 1/1992 Templeton
5,093,894 A 3/1992 Deevi et al.
5,095,647 A 3/1992 Zobele et al.
5,095,921 A 3/1992 Losee et al.
5,096,921 A 3/1992 Bollinger et al.
5,097,850 A 3/1992 Braunshteyn et al.
5,099,861 A 3/1992 Clearman et al.
5,105,831 A 4/1992 Banerjee et al.
5,119,834 A 6/1992 Shannon et al.
5,121,881 A 6/1992 Lembeck
5,129,409 A 7/1992 White et al.
5,133,368 A 7/1992 Neumann et al.
5,143,048 A 9/1992 Cheney, III
5,144,962 A 9/1992 Counts et al.
5,146,934 A 9/1992 Deevi et al.
5,159,940 A 11/1992 Hayward et al.
5,167,242 A 12/1992 Turner et al.
5,179,966 A 1/1993 Losee et al.
5,188,130 A 2/1993 Hajaligol et al.
5,190,060 A 3/1993 Gerding et al.
5,203,355 A 4/1993 Clearman et al.
5,224,498 A 7/1993 Deevi et al.
5,230,715 A 7/1993 Iizuna et al.
5,235,992 A 8/1993 Sensabaugh, Jr.
5,247,947 A 9/1993 Clearman et al.
5,249,586 A * 10/1993 Morgan .................. A24F 40/46 131/194
5,251,688 A 10/1993 Schatz
5,261,424 A 11/1993 Sprinkel, Jr.
5,269,327 A 12/1993 Counts et al.
5,271,980 A 12/1993 Bell

(56) References Cited

U.S. PATENT DOCUMENTS 5,272,216 A 12/1993 Clark, Jr. et al.
5,285,798 A 2/1994 Banerjee et al.
5,293,883 A 3/1994 Edwards
5,303,720 A 4/1994 Banerjee et al.
5,305,733 A 4/1994 Walters
5,312,046 A 5/1994 Knoch et al.
5,322,075 A 6/1994 Deevi et al.
5,327,915 A 7/1994 Porenski et al.
5,331,979 A 7/1994 Henley
5,345,951 A 9/1994 Serrano et al.
5,353,813 A 10/1994 Deevi et al.
5,357,984 A 10/1994 Farrier et al.
5,369,723 A 11/1994 Counts et al.
5,372,148 A 12/1994 McCafferty et al.
5,388,574 A 2/1995 Ingebrethsen
5,388,594 A 2/1995 Counts et al.
5,390,864 A 2/1995 Alexander
5,396,911 A 3/1995 Casey, III et al.
5,400,808 A 3/1995 Turner et al.
5,402,803 A 4/1995 Takagi
5,408,574 A 4/1995 Deevi et al.
5,412,183 A 5/1995 Buffenior
5,415,186 A 5/1995 Casey, III et al.
5,434,388 A 7/1995 Kralik et al.
5,443,560 A 8/1995 Deevi et al.
5,454,363 A 10/1995 Sata
5,461,695 A 10/1995 Knoch
5,468,936 A 11/1995 Deevi et al.
5,474,059 A 12/1995 Cooper
5,479,948 A 1/1996 Counts et al.
5,483,953 A 1/1996 Cooper
5,497,792 A 3/1996 Prasad et al.
5,499,636 A * 3/1996 Baggett, Jr. .............. A24C 5/01 131/194
5,500,511 A 3/1996 Hansen
5,501,236 A 3/1996 Hill et al.
5,502,743 A * 3/1996 Conochie ................. H05B 6/22 373/157
5,505,214 A 4/1996 Collins et al.
5,511,538 A 4/1996 Haber et al.
5,517,981 A 5/1996 Taub et al.
5,530,225 A 6/1996 Hajaligol
5,534,020 A 7/1996 Cheney, III et al.
5,538,020 A 7/1996 Farrier et al.
5,540,241 A 7/1996 Kim
5,549,906 A 8/1996 Santus
5,553,791 A 9/1996 Alexander
5,564,442 A 10/1996 MacDonald et al.
5,573,140 A 11/1996 Satomi et al.
5,573,692 A 11/1996 Das et al.
5,591,368 A * 1/1997 Fleischhauer ........... A24F 40/46 131/194
5,593,792 A 1/1997 Farrier et al.
5,613,504 A 3/1997 Collins et al.
5,613,505 A * 3/1997 Campbell ............... A24F 40/53 131/194
5,636,787 A 6/1997 Gowhari
5,645,749 A 7/1997 Wang
5,649,554 A * 7/1997 Sprinkel ............... A24F 40/465 131/194
5,659,656 A 8/1997 Das
5,665,262 A 9/1997 Hajaligol et al.
5,666,977 A 9/1997 Higgins et al.
5,687,912 A 11/1997 Denyer
5,692,291 A 12/1997 Deevi et al.
5,699,786 A 12/1997 Oshima et al.
5,711,292 A 1/1998 Hammarlund
5,726,421 A * 3/1998 Fleischhauer ........... A24F 40/40 131/194
5,736,110 A 4/1998 Angelillo et al.
5,742,251 A 4/1998 Gerber
5,743,251 A 4/1998 Howell et al.
5,771,845 A 6/1998 Pistien et al.
5,778,899 A 7/1998 Saito et al.
5,798,154 A 8/1998 Bryan
5,808,281 A 9/1998 Matsen et al.
5,837,088 A * 11/1998 Palmgren ................... C09J 5/06 156/272.4
5,845,649 A 12/1998 Saito et al.
5,865,185 A 2/1999 Collins et al.
5,865,186 A 2/1999 Volsey, II
5,878,752 A 3/1999 Adams et al.
5,902,501 A 5/1999 Nunnally et al.
5,921,233 A 7/1999 Gold et al.
5,935,486 A 8/1999 Bell et al.
5,938,125 A 8/1999 Ritsche et al.
5,958,273 A 9/1999 Koch et al.
5,984,953 A 11/1999 Sabin et al.
6,000,394 A 12/1999 Blaha-Schnabel et al.
6,026,820 A 2/2000 Baggett, Jr. et al.
6,037,568 A 3/2000 Hatanaka et al.
6,040,560 A 3/2000 Fleischhauer et al.
6,041,790 A 3/2000 Smith et al.
6,053,176 A 4/2000 Adams et al.
6,058,711 A 5/2000 Maciaszek et al.
6,079,405 A 6/2000 Justo
6,085,741 A 7/2000 Becker
6,089,857 A 7/2000 Matsuura et al.
6,095,505 A 8/2000 Miller
6,113,078 A 9/2000 Rock
6,116,231 A 9/2000 Sabin et al.
6,125,853 A 10/2000 Susa et al.
6,129,080 A 10/2000 Pitcher et al.
6,155,268 A 12/2000 Takeuchi
6,158,676 A 12/2000 Hughes
6,164,287 A 12/2000 White
6,178,963 B1 1/2001 Baik
6,209,457 B1 4/2001 Kenworthy et al.
6,223,745 B1 5/2001 Hammarlund et al.
6,224,179 B1 5/2001 Wenning et al.
6,230,703 B1 5/2001 Bono
6,234,459 B1 5/2001 Rock
6,244,573 B1 6/2001 Rock
6,248,257 B1 6/2001 Bell et al.
6,267,110 B1 7/2001 Tenenboum et al.
6,275,650 B1 8/2001 Lambert
6,283,116 B1 9/2001 Yang
6,289,889 B1 9/2001 Bell et al.
6,297,483 B2 10/2001 Sadahira
6,315,366 B1 11/2001 Post et al.
6,347,789 B1 2/2002 Rock
6,376,816 B2 4/2002 Cooper et al.
6,427,878 B1 8/2002 Greiner-Perth et al.
6,595,209 B1 7/2003 Rose et al.
6,598,607 B2 7/2003 Adiga et al.
6,644,383 B2 11/2003 Joseph et al.
6,648,306 B2 11/2003 Rock
6,652,804 B1 11/2003 Neumann et al.
6,669,176 B2 12/2003 Rock
6,681,998 B2 1/2004 Sharpe et al.
6,701,921 B2 3/2004 Sprinkel, Jr. et al.
6,708,846 B1 3/2004 Fuchs et al.
6,723,115 B1 4/2004 Daly
6,761,164 B2 7/2004 Amirpour et al.
6,769,436 B2 8/2004 Horian
6,790,496 B1 9/2004 Levander et al.
6,799,572 B2 10/2004 Nichols et al.
6,803,545 B2 10/2004 Blake et al.
6,803,550 B2 * 10/2004 Sharpe ................... H05B 6/105 219/635
6,827,080 B2 12/2004 Fish et al.
6,868,230 B2 3/2005 Gerhardinger
6,886,556 B2 5/2005 Fuchs
6,953,474 B2 10/2005 Lu
6,968,888 B2 11/2005 Kolowich
6,994,096 B2 * 2/2006 Rostami .................. A24F 40/46 131/194
7,012,227 B2 * 3/2006 Tathgur ................... F16L 47/03 219/610
7,041,123 B2 5/2006 Stapf et al.
7,077,130 B2 7/2006 Nichols et al.
7,081,211 B2 7/2006 Li et al.
7,088,914 B2 8/2006 Whittle et al.

(56) References Cited

U.S. PATENT DOCUMENTS 7,100,618 B2 9/2006 Dominguez
7,112,712 B1 9/2006 Ancell
7,163,014 B2 1/2007 Nichols et al.
7,185,659 B2 * 3/2007 Sharpe .................... A24F 40/85 131/194
7,234,459 B2 6/2007 Del
7,235,187 B2 6/2007 Li et al.
7,263,282 B2 8/2007 Meyer
7,290,549 B2 11/2007 Banerjee et al.
7,303,328 B2 12/2007 Faraldi et al.
7,335,186 B2 2/2008 O'Neil
7,373,938 B2 5/2008 Nichols et al.
7,374,063 B2 5/2008 Reid
7,400,940 B2 7/2008 McRae et al.
7,434,584 B2 10/2008 Steinberg
7,458,374 B2 12/2008 Hale et al.
7,540,286 B2 6/2009 Cross et al.
7,581,540 B2 9/2009 Hale et al.
7,581,718 B1 9/2009 Chang
7,585,493 B2 9/2009 Hale et al.
7,624,739 B2 12/2009 Snaidr et al.
7,645,442 B2 1/2010 Hale et al.
7,665,461 B2 2/2010 Zierenberg et al.
7,726,320 B2 6/2010 Robinson et al.
7,767,698 B2 8/2010 Warchol et al.
7,832,397 B2 11/2010 Lipowicz
7,832,410 B2 11/2010 Hon
7,834,295 B2 11/2010 Sharma et al.
7,913,688 B2 3/2011 Cross et al.
7,987,846 B2 8/2011 Hale et al.
7,992,554 B2 8/2011 Radomski et al.
8,061,361 B2 11/2011 Maeder et al.
8,079,371 B2 12/2011 Robinson et al.
8,081,474 B1 12/2011 Zohni et al.
8,118,021 B2 2/2012 Cho et al.
8,156,944 B2 4/2012 Han
8,342,184 B2 1/2013 Inagaki et al.
8,365,742 B2 2/2013 Hon
8,375,957 B2 2/2013 Hon
8,393,331 B2 3/2013 Hon
8,402,976 B2 * 3/2013 Fernando ................ A24F 47/00 131/194
8,430,106 B2 4/2013 Potter et al.
8,439,046 B2 5/2013 Peters et al.
8,459,271 B2 * 6/2013 Inagaki .................... A24D 1/20 131/335
8,490,628 B2 7/2013 Hon
8,511,318 B2 8/2013 Hon
8,678,013 B2 3/2014 Crooks et al.
8,689,804 B2 * 4/2014 Fernando ................ A24F 40/57 131/184.1
8,689,805 B2 4/2014 Hon
8,701,682 B2 * 4/2014 Sherwood .............. A24D 1/025 131/365
8,707,967 B2 * 4/2014 Li ........................... A24D 1/10 131/365
8,752,545 B2 6/2014 Buchberger
8,757,404 B1 6/2014 Fleckenstein
8,807,140 B1 8/2014 Scatterday
8,833,364 B2 9/2014 Buchberger
8,899,238 B2 12/2014 Robinson et al.
8,948,578 B2 2/2015 Buchberger
9,060,388 B2 6/2015 Liu
9,084,440 B2 * 7/2015 Zuber ..................... A24F 40/46
9,125,437 B2 9/2015 Kaljura
9,302,522 B2 * 4/2016 Sherwood .............. B41M 3/006
9,357,803 B2 6/2016 Egoyants et al.
9,414,619 B2 8/2016 Sizer et al.
9,414,629 B2 8/2016 Egoyants et al.
9,439,454 B2 * 9/2016 Fernando .............. H02J 7/0021
9,554,598 B2 1/2017 Egoyants et al.
9,609,894 B2 4/2017 Abramov et al.
9,623,205 B2 4/2017 Buchberger
9,668,516 B2 * 6/2017 Sherwood .............. A24D 1/025
9,693,587 B2 7/2017 Plojoux et al.
9,955,726 B2 * 5/2018 Brinkley ................. A24F 40/42
9,980,523 B2 5/2018 Abramov et al.
9,999,256 B2 6/2018 Abramov et al.
10,010,695 B2 7/2018 Buchberger
10,045,562 B2 8/2018 Buchberger
10,130,121 B2 11/2018 Plojoux et al.
10,130,780 B2 * 11/2018 Talon .................. A61M 11/041
10,524,516 B2 1/2020 Alelov
10,588,337 B2 * 3/2020 Prestia ..................... A24B 3/14
10,881,138 B2 1/2021 Saleem et al.
10,881,141 B2 1/2021 Fraser et al.
2001/0042546 A1 11/2001 Umeda et al.
2001/0042927 A1 11/2001 Rock
2001/0045424 A1 11/2001 Cooper
2001/0054421 A1 12/2001 Jaser et al.
2002/0005207 A1 1/2002 Wrenn et al.
2002/0016370 A1 2/2002 Shytle et al.
2002/0043260 A1 4/2002 Layer et al.
2002/0078951 A1 6/2002 Nichols et al.
2002/0078955 A1 6/2002 Nichols et al.
2002/0078956 A1 * 6/2002 Sharpe ................. A61M 11/042 128/203.26
2002/0079309 A1 6/2002 Cox et al.
2002/0079377 A1 6/2002 Nichols
2002/0089072 A1 7/2002 Rock
2002/0121624 A1 9/2002 Usui
2002/0170666 A1 * 11/2002 Tathgur ................. F16L 58/181 156/289
2003/0005620 A1 1/2003 Ananth et al.
2003/0007887 A1 * 1/2003 Roumpos .................. A61L 9/02 422/126
2003/0049025 A1 3/2003 Neumann et al.
2003/0052196 A1 3/2003 Fuchs
2003/0079309 A1 5/2003 Vandenbelt et al.
2003/0097164 A1 5/2003 Stapf et al.
2003/0101984 A1 6/2003 Li et al.
2003/0105192 A1 6/2003 Li et al.
2003/0106551 A1 6/2003 Sprinkel et al.
2003/0106552 A1 6/2003 Sprinkel, Jr. et al.
2003/0108342 A1 6/2003 Sherwood et al.
2003/0111637 A1 6/2003 Li et al.
2003/0146224 A1 8/2003 Fujii et al.
2003/0159702 A1 8/2003 Lindell et al.
2003/0200964 A1 10/2003 Blakley et al.
2003/0202169 A1 10/2003 Liu
2003/0209240 A1 11/2003 Hale et al.
2003/0217750 A1 11/2003 Amirpour et al.
2003/0226837 A1 12/2003 Blake et al.
2003/0230567 A1 * 12/2003 Centanni ................. F22B 1/282 219/628
2004/0003820 A1 1/2004 Iannuzzi
2004/0031485 A1 2/2004 Rustad et al.
2004/0031495 A1 * 2/2004 Steinberg .............. A61M 15/06 131/194
2004/0065314 A1 4/2004 Layer et al.
2004/0068222 A1 4/2004 Brian
2004/0083755 A1 5/2004 Kolowich
2004/0096204 A1 5/2004 Gerhardinger
2004/0129793 A1 7/2004 Nguyen et al.
2004/0149296 A1 8/2004 Rostami et al.
2004/0149297 A1 8/2004 Sharpe
2004/0149737 A1 8/2004 Sharpe et al.
2004/0177849 A1 9/2004 Del
2004/0210151 A1 10/2004 Tsukashima et al.
2004/0226568 A1 11/2004 Takeuchi et al.
2004/0234699 A1 11/2004 Hale et al.
2004/0234914 A1 11/2004 Hale et al.
2004/0234916 A1 11/2004 Hale et al.
2004/0255941 A1 12/2004 Nichols et al.
2004/0261782 A1 12/2004 Furumichi et al.
2005/0007870 A1 1/2005 Faraldi et al.
2005/0016549 A1 1/2005 Banerjee et al.
2005/0025213 A1 * 2/2005 Parks .................. G01M 99/002 219/214
2005/0031798 A1 * 2/2005 Tathgur ................... F16L 47/03 427/591
2005/0045193 A1 3/2005 Yang
2005/0063686 A1 3/2005 Whittle et al.

(56) References Cited

U.S. PATENT DOCUMENTS

2005/0066735 A1 3/2005 Beavis et al.
2005/0079166 A1 4/2005 Damani et al.
2005/0098187 A1* 5/2005 Grierson ................ A24B 15/14 131/290
2005/0133029 A1 6/2005 Nichols et al.
2005/0145260 A1 7/2005 Inagaki et al.
2005/0194013 A1 9/2005 Wright
2005/0196345 A1 9/2005 Diederichs et al.
2005/0204799 A1 9/2005 Koch
2005/0211711 A1 9/2005 Reid
2005/0236006 A1 10/2005 Cowan
2005/0268911 A1 12/2005 Cross et al.
2006/0027233 A1 2/2006 Zierenberg et al.
2006/0032501 A1 2/2006 Hale et al.
2006/0043067 A1 3/2006 Kadkhodayan et al.
2006/0078477 A1 4/2006 Althouse et al.
2006/0102175 A1 5/2006 Nelson
2006/0118128 A1 6/2006 Hoffmann et al.
2006/0137681 A1 6/2006 Von et al.
2006/0191546 A1 8/2006 Takano et al.
2006/0196518 A1 9/2006 Hon
2006/0196885 A1 9/2006 Leach et al.
2006/0255029 A1* 11/2006 Bone ...................... H05B 6/105 219/672
2007/0014549 A1 1/2007 Demarest et al.
2007/0023043 A1 2/2007 Von et al.
2007/0028916 A1 2/2007 Hale et al.
2007/0031340 A1 2/2007 Hale et al.
2007/0045288 A1 3/2007 Nelson
2007/0062548 A1 3/2007 Horstmann et al.
2007/0074734 A1 4/2007 Braunshteyn et al.
2007/0102013 A1 5/2007 Adams et al.
2007/0102533 A1 5/2007 Rosell et al.
2007/0107879 A1 5/2007 Radomski et al.
2007/0125362 A1 6/2007 Ford et al.
2007/0131219 A1 6/2007 Ford et al.
2007/0138207 A1 6/2007 Bonney et al.
2007/0155255 A1 7/2007 Galauner et al.
2007/0175476 A1 8/2007 Lipowicz
2007/0204858 A1 9/2007 Abelbeck
2007/0204864 A1 9/2007 Grychowski et al.
2007/0204868 A1 9/2007 Bollinger et al.
2007/0222112 A1 9/2007 Christ et al.
2007/0235046 A1* 10/2007 Gedevanishvili ...... A24D 3/046 131/201
2007/0267407 A1* 11/2007 Loveless .................. H05B 6/36 219/661
2007/0279377 A1 12/2007 Hillis et al.
2007/0283972 A1 12/2007 Monsees et al.
2007/0289720 A1 12/2007 Sunol et al.
2008/0027694 A1* 1/2008 Gitman .................. A61B 5/319 703/11
2008/0031267 A1* 2/2008 Imao ..................... H04L 69/163 370/401
2008/0038363 A1 2/2008 Zaffaroni et al.
2008/0085139 A1 4/2008 Roof
2008/0092912 A1 4/2008 Robinson et al.
2008/0149118 A1 6/2008 Oglesby et al.
2008/0149622 A1 6/2008 Weiss et al.
2008/0156326 A1 7/2008 Belcastro et al.
2008/0216828 A1 9/2008 Wensley et al.
2008/0233318 A1 9/2008 Coyle
2008/0241255 A1 10/2008 Rose et al.
2008/0257367 A1 10/2008 Paterno et al.
2008/0276947 A1 11/2008 Martzel
2008/0302374 A1 12/2008 Wengert et al.
2008/0312674 A1 12/2008 Chen et al.
2009/0015717 A1 1/2009 Arnao et al.
2009/0032034 A1 2/2009 Steinberg
2009/0056728 A1 3/2009 Baker
2009/0065011 A1 3/2009 Maeder et al.
2009/0071477 A1 3/2009 Hale et al.
2009/0078711 A1 3/2009 Farone et al.
2009/0090349 A1 4/2009 Donovan
2009/0090351 A1 4/2009 Sunol et al.
2009/0090472 A1 4/2009 Radomski
2009/0095287 A1 4/2009 Emarlou
2009/0095311 A1 4/2009 Han
2009/0107492 A1 4/2009 Ooida
2009/0114215 A1 5/2009 Boeck et al.
2009/0126745 A1 5/2009 Hon
2009/0127253 A1 5/2009 Stark et al.
2009/0151717 A1 6/2009 Bowen et al.
2009/0162294 A1 6/2009 Werner
2009/0180968 A1 7/2009 Hale et al.
2009/0188490 A1 7/2009 Han
2009/0199843 A1 8/2009 Farone et al.
2009/0217923 A1 9/2009 Boehm et al.
2009/0230117 A1 9/2009 Fernando et al.
2009/0241947 A1 10/2009 Bedini et al.
2009/0255923 A1* 10/2009 Buehrer ................. H05B 6/145 219/635
2009/0260641 A1 10/2009 Monsees et al.
2009/0260642 A1 10/2009 Monsees et al.
2009/0272379 A1 11/2009 Thorens et al.
2009/0280043 A1 11/2009 Ferguson
2009/0293892 A1 12/2009 Williams et al.
2009/0301363 A1 12/2009 Damani et al.
2009/0301471 A1 12/2009 Stirzel
2009/0302019 A1 12/2009 Selenski et al.
2009/0304372 A1 12/2009 Gubler et al.
2010/0006092 A1 1/2010 Hale et al.
2010/0025023 A1 2/2010 Schmidt et al.
2010/0031968 A1 2/2010 Sheikh et al.
2010/0043809 A1 2/2010 Magnon
2010/0059070 A1 3/2010 Potter et al.
2010/0065052 A1 3/2010 Sharma et al.
2010/0065653 A1 3/2010 Wingo et al.
2010/0068154 A1 3/2010 Sharma et al.
2010/0083959 A1 4/2010 Siller
2010/0089381 A1 4/2010 Bolmer et al.
2010/0108059 A1 5/2010 Axelsson et al.
2010/0126516 A1 5/2010 Yomtov et al.
2010/0147299 A1 6/2010 Row et al.
2010/0181387 A1 7/2010 Zaffaroni et al.
2010/0200006 A1 8/2010 Robinson et al.
2010/0236546 A1 9/2010 Yamada et al.
2010/0242974 A1 9/2010 Pan
2010/0242975 A1 9/2010 Hearn
2010/0258585 A1 10/2010 Jamison
2010/0268212 A1* 10/2010 Manwaring ............ A61B 18/10 606/31
2010/0300467 A1 12/2010 Kuistila et al.
2010/0307518 A1 12/2010 Wang
2010/0313901 A1 12/2010 Fernando et al.
2011/0005535 A1 1/2011 Xiu
2011/0011396 A1 1/2011 Fang
2011/0030671 A1 2/2011 Ferguson et al.
2011/0036363 A1 2/2011 Urtsev et al.
2011/0090266 A1 4/2011 King et al.
2011/0094523 A1 4/2011 Thorens et al.
2011/0120989 A1 5/2011 Schilling et al.
2011/0126848 A1* 6/2011 Zuber ..................... A24F 40/46 131/329
2011/0155153 A1 6/2011 Thorens et al.
2011/0155718 A1 6/2011 Greim et al.
2011/0192408 A1 8/2011 Inagaki et al.
2011/0192914 A1 8/2011 Ishigami
2011/0226236 A1 9/2011 Buchberger
2011/0240022 A1* 10/2011 Hodges ................... B05B 17/04 128/203.26
2011/0264084 A1 10/2011 Reid
2011/0277757 A1 11/2011 Terry et al.
2011/0283458 A1 11/2011 Gillette et al.
2011/0290266 A1 12/2011 Koeller
2011/0290267 A1 12/2011 Yamada et al.
2011/0297166 A1 12/2011 Takeuchi et al.
2011/0303230 A1 12/2011 Thiry
2011/0303231 A1 12/2011 Li et al.
2012/0006342 A1 1/2012 Rose et al.
2012/0006343 A1 1/2012 Renaud et al.
2012/0132196 A1 5/2012 Vladyslavovych
2012/0145169 A1 6/2012 Wu

(56) References Cited

U.S. PATENT DOCUMENTS

2012/0145189 A1 6/2012 Knopow et al.
2012/0234315 A1* 9/2012 Li ........................ A24F 40/465 128/200.21
2012/0234821 A1 9/2012 Shimizu
2012/0255546 A1 10/2012 Goetz et al.
2012/0260927 A1 10/2012 Liu
2012/0285476 A1 11/2012 Hon
2013/0042865 A1 2/2013 Monsees et al.
2013/0061861 A1 3/2013 Hearn
2013/0074857 A1 3/2013 Buchberger
2013/0081623 A1 4/2013 Buchberger
2013/0087160 A1 4/2013 Gherghe
2013/0133675 A1* 5/2013 Shinozaki ................ A24D 1/22 131/329
2013/0142782 A1 6/2013 Rahmel et al.
2013/0152922 A1 6/2013 Benassayag
2013/0192615 A1 8/2013 Tucker et al.
2013/0213419 A1 8/2013 Tucker et al.
2013/0284192 A1 10/2013 Peleg et al.
2013/0306084 A1 11/2013 Flick
2013/0333700 A1 12/2013 Buchberger
2013/0340779 A1 12/2013 Liu
2014/0000638 A1 1/2014 Sebastian et al.
2014/0060528 A1 3/2014 Liu
2014/0060554 A1 3/2014 Collett et al.
2014/0060555 A1 3/2014 Chang et al.
2014/0096781 A1 4/2014 Sears et al.
2014/0182608 A1 7/2014 Egoyants et al.
2014/0182843 A1 7/2014 Vinegar
2014/0196716 A1 7/2014 Liu
2014/0202454 A1 7/2014 Buchberger
2014/0202476 A1 7/2014 Egoyants et al.
2014/0209105 A1 7/2014 Sears et al.
2014/0216482 A1* 8/2014 Dotan ..................... A24F 40/40 131/328
2014/0216485 A1 8/2014 Egoyants et al.
2014/0238396 A1 8/2014 Buchberger
2014/0238423 A1 8/2014 Tucker et al.
2014/0238424 A1 8/2014 Macko et al.
2014/0238737 A1 8/2014 Backman
2014/0261490 A1 9/2014 Kane
2014/0270726 A1 9/2014 Egoyants et al.
2014/0270730 A1 9/2014 DePiano et al.
2014/0283825 A1 9/2014 Buchberger
2014/0286630 A1 9/2014 Buchberger
2014/0299125 A1 10/2014 Buchberger
2014/0305449 A1 10/2014 Plojoux et al.
2014/0326257 A1 11/2014 Jalloul et al.
2014/0334802 A1 11/2014 Dubief
2014/0338680 A1 11/2014 Abramov et al.
2014/0360515 A1 12/2014 Vasiliev et al.
2015/0020825 A1 1/2015 Galloway et al.
2015/0040925 A1 2/2015 Saleem et al.
2015/0114406 A1 4/2015 Newton
2015/0114411 A1 4/2015 Buchberger
2015/0142088 A1 5/2015 Riva Godoy
2015/0157055 A1 6/2015 Lord
2015/0157756 A1 6/2015 Duffield et al.
2015/0196058 A1 7/2015 Lord
2015/0208728 A1 7/2015 Lord
2015/0223292 A1 8/2015 Duffield et al.
2015/0223520 A1 8/2015 Phillips et al.
2015/0245669 A1 9/2015 Cadieux et al.
2015/0272219 A1 10/2015 Hatrick et al.
2015/0282256 A1* 10/2015 Iguro ....................... H05B 6/06 219/645
2015/0302971 A1 10/2015 Wagman et al.
2015/0320116 A1 11/2015 Bleloch et al.
2016/0003403 A1 1/2016 Smith
2016/0036222 A1* 2/2016 Templeton ................ H02J 1/10 307/24
2016/0044963 A1 2/2016 Saleem
2016/0073693 A1 3/2016 Reevell
2016/0088685 A1 3/2016 Henke et al.
2016/0106154 A1 4/2016 Lord
2016/0106155 A1 4/2016 Reevell
2016/0146506 A1 5/2016 Brereton et al.
2016/0150825 A1 6/2016 Mironov
2016/0150828 A1 6/2016 Goldstein et al.
2016/0168438 A1 6/2016 Harding et al.
2016/0248280 A1 8/2016 Ben-Shalom et al.
2016/0255879 A1 9/2016 Paprocki et al.
2016/0295921 A1 10/2016 Mironov et al.
2017/0006916 A1 1/2017 Liu
2017/0042245 A1 2/2017 Buchberger et al.
2017/0055574 A1 3/2017 Kaufman et al.
2017/0055575 A1* 3/2017 Wilke .................... A24B 15/16
2017/0055580 A1* 3/2017 Blandino .............. A24F 40/465
2017/0055581 A1* 3/2017 Wilke ....................... H05B 6/10
2017/0055582 A1* 3/2017 Blandino .............. A24F 40/465
2017/0055583 A1* 3/2017 Blandino ................. H05B 6/36
2017/0055584 A1 3/2017 Blandino et al.
2017/0071250 A1 3/2017 Mironov
2017/0079325 A1 3/2017 Mironov
2017/0086508 A1* 3/2017 Mironov .................. A24D 1/20
2017/0095006 A1 4/2017 Egoyants et al.
2017/0119046 A1* 5/2017 Kaufman ............... H05B 6/105
2017/0119047 A1* 5/2017 Blandino ................. A24C 5/01
2017/0119048 A1* 5/2017 Kaufman .............. A24F 40/465
2017/0119049 A1* 5/2017 Blandino ................ A24F 40/46
2017/0119050 A1* 5/2017 Blandino ................ A24F 40/42
2017/0119051 A1 5/2017 Blandino et al.
2017/0119054 A1 5/2017 Zinovik et al.
2017/0156403 A1 6/2017 Gill et al.
2017/0156406 A1 6/2017 Abramov et al.
2017/0156407 A1 6/2017 Abramov et al.
2017/0197043 A1 7/2017 Buchberger
2017/0197044 A1 7/2017 Buchberger
2017/0197046 A1 7/2017 Buchberger
2017/0197048 A1 7/2017 Khosrowshahi et al.
2017/0197049 A1 7/2017 Doll
2017/0197050 A1 7/2017 Reinburg et al.
2017/0231281 A1 8/2017 Hatton et al.
2017/0303585 A1 10/2017 Florack et al.
2017/0332700 A1 11/2017 Plews et al.
2017/0340008 A1 11/2017 Sebastian et al.
2018/0184713 A1* 7/2018 Mironov ................. A24F 40/42
2018/0192700 A1* 7/2018 Fraser ................... A24F 40/465
2018/0214645 A1 8/2018 Reevell
2018/0235279 A1* 8/2018 Wilke ...................... H05B 3/34
2018/0242633 A1* 8/2018 Wilke ...................... A24D 1/20
2018/0242636 A1* 8/2018 Blandino ............. H05B 1/0291
2018/0249760 A1* 9/2018 Kaufman ............... A24B 15/16
2018/0271171 A1 9/2018 Abramov et al.
2018/0279677 A1* 10/2018 Blandino ................. H05B 6/36
2018/0317552 A1* 11/2018 Kaufman ............... H05B 6/105
2018/0317553 A1* 11/2018 Blandino ................. A24C 5/01
2018/0317554 A1* 11/2018 Kaufman ............... H05B 6/105
2018/0317555 A1* 11/2018 Blandino ............. H05B 3/0014
2018/0325173 A1* 11/2018 Blandino ............. A24B 15/165
2019/0000142 A1 1/2019 Lavanchy et al.
2019/0014820 A1 1/2019 Malgat
2019/0082738 A1* 3/2019 Blandino ................ A24F 40/46
2019/0191780 A1* 6/2019 Wilke .................... H05B 6/108
2019/0230988 A1* 8/2019 Aoun ..................... H05B 6/105
2019/0239555 A1* 8/2019 Nicholson .............. H05B 6/105
2019/0313695 A1* 10/2019 Kaufman .............. A24F 40/465
2019/0364973 A1* 12/2019 Kaufman .............. A24F 40/465
2020/0054068 A1* 2/2020 Blandino .............. A24F 40/465
2020/0054069 A1* 2/2020 Blandino .............. A24F 40/465
2020/0229497 A1* 7/2020 Aoun ..................... H05B 6/105
2020/0268053 A1* 8/2020 Thorsen ................... H05B 6/44
2020/0288774 A1* 9/2020 Blandino ................. H05B 3/34
2020/0352237 A1* 11/2020 Kaufman .............. A24F 40/465
2021/0093008 A1 4/2021 White et al.
2021/0093012 A1 4/2021 White et al.
2021/0137167 A1* 5/2021 Aoun .................... A24F 40/465
2021/0186109 A1 6/2021 Milligan et al.

FOREIGN PATENT DOCUMENTS

AT 321190 B 3/1975
AT 321191 B 3/1975

(56) References Cited

FOREIGN PATENT DOCUMENTS

| | | | |
|---|---|---|---|
| AT | 507187 | B1 | 3/2010 |
| AT | 508244 | A4 | 12/2010 |
| AT | 510405 | A4 | 4/2012 |
| AT | 510504 | A1 | 4/2012 |
| AU | 6393173 | A | 6/1975 |
| AU | 2002364521 | A1 | 6/2003 |
| AU | 2018241908 | B2 | 9/2020 |
| AU | 2020281092 | A1 | 1/2021 |
| CA | 2160990 | A1 | 10/1994 |
| CA | 2146954 | A1 | 10/1996 |
| CA | 2309376 | A1 | 11/2000 |
| CA | 2414161 | A1 | 1/2002 |
| CA | 2414191 | A1 | 1/2002 |
| CA | 2520759 | A1 | 10/2004 |
| CA | 2492255 | A1 | 7/2006 |
| CA | 2668465 | A1 | 12/2009 |
| CA | 2712412 | A1 | 12/2009 |
| CA | 2641869 | A1 | 5/2010 |
| CA | 2862048 | A1 | 7/2013 |
| CA | 2923377 | A1 | 6/2015 |
| CA | 2989375 | A1 | 1/2017 |
| CH | 513656 | A | 10/1971 |
| CH | 698603 | B1 | 9/2009 |
| CL | 199400288 | A1 | 8/1995 |
| CL | 2007002226 | A1 | 2/2008 |
| CL | 2013003637 | A1 | 7/2014 |
| CL | 2014002840 | A1 | 12/2014 |
| CL | 2017003408 | A1 | 6/2018 |
| CN | 86102917 | A | 11/1987 |
| CN | 1038085 | A | 12/1989 |
| CN | 1040914 | A | 4/1990 |
| CN | 1043076 | A | 6/1990 |
| CN | 1045691 | A | 10/1990 |
| CN | 2092880 | U | 1/1992 |
| CN | 1059649 | A | 3/1992 |
| CN | 2144261 | Y | 10/1993 |
| CN | 1106812 | A | 8/1995 |
| CN | 2220168 | Y | 2/1996 |
| CN | 1121385 | | 4/1996 |
| CN | 1122213 | A | 5/1996 |
| CN | 1123000 | A | 5/1996 |
| CN | 1123001 | A | 5/1996 |
| CN | 1126426 | A | 7/1996 |
| CN | 2246744 | Y | 2/1997 |
| CN | 1158757 | A | 9/1997 |
| CN | 1161635 | A | 10/1997 |
| CN | 1195270 | A | 10/1998 |
| CN | 1196660 | A | 10/1998 |
| CN | 1196661 | A | 10/1998 |
| CN | 1205849 | A | 1/1999 |
| CN | 1209731 | A | 3/1999 |
| CN | 1287890 | A | 3/2001 |
| CN | 1293591 | A | 5/2001 |
| CN | 1293596 | A | 5/2001 |
| CN | 1312730 | A | 9/2001 |
| CN | 1106812 | C | 4/2003 |
| CN | 1130109 | C | 12/2003 |
| CN | 1130137 | C | 12/2003 |
| CN | 2598364 | Y | 1/2004 |
| CN | 1495417 | A | 5/2004 |
| CN | 1151739 | C | 6/2004 |
| CN | 1545823 | A | 11/2004 |
| CN | 1575135 | A | 2/2005 |
| CN | 1578895 | A | 2/2005 |
| CN | 1641976 | A | 7/2005 |
| CN | 2719043 | Y | 8/2005 |
| CN | 1679419 | A | 10/2005 |
| CN | 1694765 | A | 11/2005 |
| CN | 1703279 | A | 11/2005 |
| CN | 200966824 | Y | 10/2007 |
| CN | 101084034 | A | 12/2007 |
| CN | 201076006 | Y | 6/2008 |
| CN | 101238047 | A | 8/2008 |
| CN | 101267749 | A | 9/2008 |
| CN | 101277622 | A | 10/2008 |
| CN | 101282660 | A | 10/2008 |
| CN | 201185656 | Y | 1/2009 |
| CN | 101390659 | A | 3/2009 |
| CN | 201199922 | Y | 3/2009 |
| CN | 201238609 | Y | 5/2009 |
| CN | 101500443 | A | 8/2009 |
| CN | 101516425 | A | 8/2009 |
| CN | 101557728 | A | 10/2009 |
| CN | 201375023 | Y | 1/2010 |
| CN | 101648041 | A | 2/2010 |
| CN | 201445686 | U | 5/2010 |
| CN | 101878958 | A | 11/2010 |
| CN | 101912654 | A | 12/2010 |
| CN | 101925309 | A | 12/2010 |
| CN | 102014677 | A | 4/2011 |
| CN | 201869778 | U | 6/2011 |
| CN | 102131411 | A | 7/2011 |
| CN | 102186271 | A | 9/2011 |
| CN | 102212340 | A | 10/2011 |
| CN | 202172846 | U | 3/2012 |
| CN | 102483237 | A | 5/2012 |
| CN | 102499466 | A | 6/2012 |
| CN | 102539005 | A | 7/2012 |
| CN | 102575954 | A | 7/2012 |
| CN | 102604599 | A | 7/2012 |
| CN | 202351223 | U | 7/2012 |
| CN | 102655773 | A | 9/2012 |
| CN | 202722498 | U | 2/2013 |
| CN | 202750708 | U | 2/2013 |
| CN | 103052380 | A | 4/2013 |
| CN | 103054196 | A | 4/2013 |
| CN | 103202540 | A | 7/2013 |
| CN | 103359550 | A | 10/2013 |
| CN | 203369386 | U | 1/2014 |
| CN | 103608619 | A | 2/2014 |
| CN | 103689812 | A | 4/2014 |
| CN | 103689815 | A | 4/2014 |
| CN | 103763954 | A | 4/2014 |
| CN | 103974640 | A | 8/2014 |
| CN | 103997922 | A | 8/2014 |
| CN | 104010531 | A | 8/2014 |
| CN | 203748673 | U | 8/2014 |
| CN | 203761188 | U | 8/2014 |
| CN | 203762288 | U | 8/2014 |
| CN | 104039183 | A | 9/2014 |
| CN | 104095291 | A | 10/2014 |
| CN | 104095293 | A | 10/2014 |
| CN | 104095295 | A | 10/2014 |
| CN | 203952405 | U | 11/2014 |
| CN | 104203016 | | 12/2014 |
| CN | 104223359 | A | 12/2014 |
| CN | 203986095 | U | 12/2014 |
| CN | 104256899 | A | 1/2015 |
| CN | 204091003 | U | 1/2015 |
| CN | 104540406 | A | 4/2015 |
| CN | 104619202 | A | 5/2015 |
| CN | 104664608 | A | 6/2015 |
| CN | 104677116 | A | 6/2015 |
| CN | 104703308 | A | 6/2015 |
| CN | 104720121 | A | 6/2015 |
| CN | 204440191 | U | 7/2015 |
| CN | 204519365 | U | 8/2015 |
| CN | 204539505 | U | 8/2015 |
| CN | 204599333 | U | 9/2015 |
| CN | 204949521 | U | 1/2016 |
| CN | 105307524 | A | 2/2016 |
| CN | 105307525 | A | 2/2016 |
| CN | 106102863 | A | 11/2016 |
| CN | 106455712 | A | 2/2017 |
| CN | 106617325 | A | 5/2017 |
| CN | 109330030 | A | 2/2019 |
| DE | 360431 | C | 10/1922 |
| DE | 1100884 | B | 3/1961 |
| DE | 1425872 | A1 | 11/1968 |
| DE | 1290499 | B | 3/1969 |
| DE | 1813993 | A1 | 6/1970 |
| DE | 1425871 | B1 | 10/1970 |
| DE | 1950439 | A1 | 4/1971 |
| DE | 2315789 | A1 | 10/1973 |

(56) References Cited

FOREIGN PATENT DOCUMENTS

| | | | |
|---|---|---|---|
| DE | 3148335 | A1 | 7/1983 |
| DE | 3218760 | A1 | 12/1983 |
| DE | 3936687 | A1 | 5/1990 |
| DE | 4105370 | A1 | 8/1992 |
| DE | 4307144 | C2 | 1/1995 |
| DE | 4343578 | | 6/1995 |
| DE | 29509286 | U1 | 8/1995 |
| DE | 4420366 | A1 | 12/1995 |
| DE | 29700307 | U1 | 4/1997 |
| DE | 29713866 | U1 | 10/1997 |
| DE | 29719509 | U1 | 1/1998 |
| DE | 19630619 | A1 | 2/1998 |
| DE | 19654945 | A1 | 3/1998 |
| DE | 19854007 | A1 | 5/2000 |
| DE | 19854009 | A1 | 5/2000 |
| DE | 10058642 | A1 | 6/2001 |
| DE | 10007521 | A1 | 8/2001 |
| DE | 10064288 | A1 | 8/2001 |
| DE | 10164587 | A1 | 7/2003 |
| DE | 10330681 | B3 | 6/2004 |
| DE | 102005024803 | A1 | 6/2006 |
| DE | 202006013439 | U1 | 10/2006 |
| DE | 102005023278 | A1 | 11/2006 |
| DE | 102005056885 | A1 | 5/2007 |
| DE | 102006041544 | A1 | 8/2007 |
| DE | 102006041042 | A1 | 3/2008 |
| DE | 102006047146 | A1 | 4/2008 |
| DE | 102007011120 | A1 | 9/2008 |
| DE | 102008034509 | A1 | 4/2009 |
| DE | 102008013303 | A1 | 9/2009 |
| DE | 202009010400 | U1 | 11/2009 |
| DE | 102008038121 | A1 | 2/2010 |
| DE | 202010011436 | U1 | 11/2010 |
| DE | 102009047185 | A1 | 6/2011 |
| DE | 102010046482 | A1 | 3/2012 |
| DE | 202013100606 | U1 | 2/2013 |
| DE | 102013002555 | A1 | 6/2014 |
| DK | 114399 | B | 6/1969 |
| DK | 488488 | A | 3/1989 |
| DK | 0540774 | T3 | 7/1995 |
| DK | 0540775 | T3 | 8/1997 |
| EP | 0033668 | A1 | 8/1981 |
| EP | 0076897 | A1 | 4/1983 |
| EP | 0033668 | B1 | 6/1983 |
| EP | 0149997 | A2 | 7/1985 |
| EP | 0194257 | A1 | 9/1986 |
| EP | 0280262 | A2 | 8/1988 |
| EP | 0295122 | A2 | 12/1988 |
| EP | 0309227 | A2 | 3/1989 |
| EP | 0358002 | A2 | 3/1990 |
| EP | 0358114 | A2 | 3/1990 |
| EP | 0371285 | A2 | 6/1990 |
| EP | 0418464 | A2 | 3/1991 |
| EP | 0430559 | A2 | 6/1991 |
| EP | 0430566 | A2 | 6/1991 |
| EP | 0438862 | A2 | 7/1991 |
| EP | 0444553 | A2 | 9/1991 |
| EP | 0488488 | A1 | 6/1992 |
| EP | 0491952 | A1 | 7/1992 |
| EP | 0503767 | A1 | 9/1992 |
| EP | 0503794 | A1 | 9/1992 |
| EP | 0520231 | A2 | 12/1992 |
| EP | 0603613 | A1 | 6/1994 |
| EP | 0430559 | B1 | 3/1995 |
| EP | 0703735 | A1 | 4/1996 |
| EP | 0354661 | B1 | 4/1997 |
| EP | 0540775 | B1 | 7/1997 |
| EP | 0823492 | A2 | 2/1998 |
| EP | 0824927 | A2 | 2/1998 |
| EP | 0845220 | A1 | 6/1998 |
| EP | 0857431 | A1 | 8/1998 |
| EP | 0653218 | B1 | 9/1998 |
| EP | 0884928 | A1 | 12/1998 |
| EP | 0893071 | A1 | 1/1999 |
| EP | 1064083 | A2 | 1/2001 |
| EP | 1064101 | A2 | 1/2001 |
| EP | 1076014 | A2 | 2/2001 |
| EP | 1111191 | A2 | 6/2001 |
| EP | 0703735 | B1 | 7/2001 |
| EP | 1128741 | A1 | 9/2001 |
| EP | 1128742 | A1 | 9/2001 |
| EP | 1128743 | A1 | 9/2001 |
| EP | 1148905 | A2 | 10/2001 |
| EP | 1166814 | A2 | 1/2002 |
| EP | 1166847 | A2 | 1/2002 |
| EP | 1203189 | A1 | 5/2002 |
| EP | 1217320 | A2 | 6/2002 |
| EP | 1298993 | A1 | 4/2003 |
| EP | 1299499 | A1 | 4/2003 |
| EP | 1299500 | A2 | 4/2003 |
| EP | 1301152 | A2 | 4/2003 |
| EP | 0845220 | B1 | 9/2003 |
| EP | 1349601 | A2 | 10/2003 |
| EP | 1357025 | A2 | 10/2003 |
| EP | 1390112 | A1 | 2/2004 |
| EP | 1409051 | A2 | 4/2004 |
| EP | 1439876 | A2 | 7/2004 |
| EP | 1454840 | A1 | 9/2004 |
| EP | 1490452 | A2 | 12/2004 |
| EP | 1506792 | A2 | 2/2005 |
| EP | 1609376 | A1 | 12/2005 |
| EP | 1618803 | A1 | 1/2006 |
| EP | 1625334 | A2 | 2/2006 |
| EP | 1625335 | A2 | 2/2006 |
| EP | 1625336 | A2 | 2/2006 |
| EP | 1454840 | B1 | 9/2006 |
| EP | 1536703 | B1 | 9/2006 |
| EP | 1702639 | A2 | 9/2006 |
| EP | 1736065 | A1 | 12/2006 |
| EP | 1749548 | A2 | 2/2007 |
| EP | 1757921 | A2 | 2/2007 |
| EP | 1867357 | A1 | 12/2007 |
| EP | 1891867 | A2 | 2/2008 |
| EP | 1940254 | A2 | 7/2008 |
| EP | 1996880 | A2 | 12/2008 |
| EP | 2011033 | A2 | 1/2009 |
| EP | 2018886 | A1 | 1/2009 |
| EP | 2022349 | A1 | 2/2009 |
| EP | 2044967 | A1 | 4/2009 |
| EP | 1357025 | B1 | 7/2009 |
| EP | 2083642 | A1 | 8/2009 |
| EP | 2110033 | A1 | 10/2009 |
| EP | 2110034 | A1 | 10/2009 |
| EP | 2113178 | A1 | 11/2009 |
| EP | 2138058 | A1 | 12/2009 |
| EP | 2138059 | A1 | 12/2009 |
| EP | 1947965 | B1 | 2/2010 |
| EP | 2179229 | A2 | 4/2010 |
| EP | 2191735 | A1 | 6/2010 |
| EP | 2227973 | A1 | 9/2010 |
| EP | 2234508 | A2 | 10/2010 |
| EP | 2241203 | A2 | 10/2010 |
| EP | 2138057 | B1 | 11/2010 |
| EP | 2246086 | A2 | 11/2010 |
| EP | 2249669 | A1 | 11/2010 |
| EP | 2253541 | A1 | 11/2010 |
| EP | 2257195 | A1 | 12/2010 |
| EP | 2277398 | A1 | 1/2011 |
| EP | 2303043 | A2 | 4/2011 |
| EP | 2316286 | A1 | 5/2011 |
| EP | 2327318 | A1 | 6/2011 |
| EP | 2330866 | A2 | 6/2011 |
| EP | 2340729 | A1 | 7/2011 |
| EP | 2340730 | A1 | 7/2011 |
| EP | 2368449 | A1 | 9/2011 |
| EP | 2003997 | B1 | 10/2011 |
| EP | 2394520 | A1 | 12/2011 |
| EP | 2408494 | A1 | 1/2012 |
| EP | 2444112 | A1 | 4/2012 |
| EP | 2253541 | B1 | 5/2012 |
| EP | 2472185 | A1 | 7/2012 |
| EP | 2512205 | A1 | 10/2012 |
| EP | 2520186 | A1 | 11/2012 |
| EP | 2523752 | A1 | 11/2012 |

(56) References Cited

FOREIGN PATENT DOCUMENTS

| | | | |
|---|---|---|---|
| EP | 2542131 | A2 | 1/2013 |
| EP | 2645814 | A1 | 10/2013 |
| EP | 2696652 | A1 | 2/2014 |
| EP | 2698070 | A1 | 2/2014 |
| EP | 2760303 | A2 | 8/2014 |
| EP | 2762019 | A1 | 8/2014 |
| EP | 2785208 | A1 | 10/2014 |
| EP | 2835062 | A1 | 2/2015 |
| EP | 2907397 | | 8/2015 |
| EP | 2967156 | A1 | 1/2016 |
| EP | 2975958 | A1 | 1/2016 |
| EP | 2996504 | A1 | 3/2016 |
| EP | 2967156 | B1 | 11/2016 |
| EP | 2996504 | B1 | 11/2016 |
| EP | 3337342 | A1 | 6/2018 |
| EP | 3367828 | A1 | 9/2018 |
| ES | 262308 | U | 6/1982 |
| FR | 718708 | A | 1/1932 |
| FR | 960469 | A | 4/1950 |
| FR | 1418189 | A | 11/1965 |
| FR | 2573985 | A1 | 6/1986 |
| FR | 2604093 | A1 | 3/1988 |
| FR | 2700697 | A1 | 7/1994 |
| FR | 2730166 | A1 | 8/1996 |
| FR | 2818152 | A1 | 6/2002 |
| FR | 2842791 | B1 | 4/2005 |
| FR | 2873584 | B1 | 11/2006 |
| GB | 25575 | A | 3/1912 |
| GB | 191126138 | A | 3/1912 |
| GB | 347650 | A | 4/1931 |
| GB | 353745 | A | 7/1931 |
| GB | 426247 | A | 3/1935 |
| GB | 910166 | A | 11/1962 |
| GB | 922310 | A | 3/1963 |
| GB | 958867 | A | 5/1964 |
| GB | 1104214 | A | 2/1968 |
| GB | 1227333 | A | 4/1971 |
| GB | 1313525 | A | 4/1973 |
| GB | 1379688 | A | 1/1975 |
| GB | 1431334 | A | 4/1976 |
| GB | 2294401 | A | 5/1996 |
| GB | 2323033 | A | 9/1998 |
| GB | 2342874 | A | 4/2000 |
| GB | 2388040 | A | 11/2003 |
| GB | 2412326 | A | 9/2005 |
| GB | 2412876 | A | 10/2005 |
| GB | 2448478 | A | 10/2008 |
| GB | 2487851 | A | 8/2012 |
| GB | 2495923 | A | 5/2013 |
| GB | 2504732 | A | 2/2014 |
| HK | 1196511 | A1 | 12/2014 |
| HK | 1226611 | | 10/2017 |
| IE | 63083 | B1 | 3/1995 |
| IT | 1289590 | B1 | 10/1998 |
| IT | RM20120193 | A1 | 8/2012 |
| JP | S4961986 | A | 6/1974 |
| JP | S5096908 | A | 8/1975 |
| JP | S5314173 | A | 2/1978 |
| JP | S5594260 | A | 7/1980 |
| JP | S5752456 | A | 3/1982 |
| JP | S57110260 | A | 7/1982 |
| JP | S57177769 | A | 11/1982 |
| JP | S59106340 | A | 6/1984 |
| JP | S6196763 | A | 5/1986 |
| JP | S6196765 | A | 5/1986 |
| JP | S62501050 | A | 4/1987 |
| JP | S62205184 | A | 9/1987 |
| JP | S6360322 | A | 3/1988 |
| JP | S63153666 | A | 6/1988 |
| JP | H01191674 | A | 8/1989 |
| JP | H01166953 | U | 11/1989 |
| JP | H0292986 | A | 4/1990 |
| JP | H0292988 | A | 4/1990 |
| JP | H02124081 | A | 5/1990 |
| JP | H02127493 | A | 5/1990 |
| JP | H02190171 | A | 7/1990 |
| JP | H034479 | A | 1/1991 |
| JP | H0341185 | A | 2/1991 |
| JP | H03112478 | A | 5/1991 |
| JP | H03192677 | A | 8/1991 |
| JP | H03232481 | A | 10/1991 |
| JP | H05103836 | A | 4/1993 |
| JP | H05115272 | A | 5/1993 |
| JP | H05193668 | A | 8/1993 |
| JP | H05212100 | A | 8/1993 |
| JP | H05309136 | A | 11/1993 |
| JP | H062164 | B1 | 1/1994 |
| JP | H06189861 | A | 7/1994 |
| JP | H06295782 | A | 10/1994 |
| JP | H06315366 | A | 11/1994 |
| JP | H07147965 | A | 6/1995 |
| JP | H0851175 | A | 2/1996 |
| JP | H08942 | U | 6/1996 |
| JP | 2519658 | B2 | 7/1996 |
| JP | H08228751 | A | 9/1996 |
| JP | H 8-511175 | | 11/1996 |
| JP | H08299862 | A | 11/1996 |
| JP | H08511176 | A | 11/1996 |
| JP | H09107943 | A | 4/1997 |
| JP | H09257256 | A | 9/1997 |
| JP | 3044574 | U | 12/1997 |
| JP | 3053426 | U | 10/1998 |
| JP | H 11-503912 | | 4/1999 |
| JP | H1189551 | A | 4/1999 |
| JP | H11125390 | A | 5/1999 |
| JP | H11169157 | A | 6/1999 |
| JP | H11507234 | A | 6/1999 |
| JP | H11178562 | A | 7/1999 |
| JP | H11514081 | A | 11/1999 |
| JP | 2000051556 | A | 2/2000 |
| JP | 3016586 | B2 | 3/2000 |
| JP | 20000082576 | | 3/2000 |
| JP | 2000093155 | A | 4/2000 |
| JP | 2000119643 | A | 4/2000 |
| JP | 3078033 | B2 | 8/2000 |
| JP | 2000515576 | A | 11/2000 |
| JP | 3118462 | B2 | 12/2000 |
| JP | 3118463 | B2 | 12/2000 |
| JP | 2001063776 | A | 3/2001 |
| JP | 2002-170657 | | 6/2002 |
| JP | 2002527153 | A | 8/2002 |
| JP | 2002253593 | A | 9/2002 |
| JP | 2002529111 | A | 9/2002 |
| JP | 2002336290 | A | 11/2002 |
| JP | 2003034785 | A | 2/2003 |
| JP | 3392138 | B2 | 3/2003 |
| JP | 3413208 | B2 | 6/2003 |
| JP | 2004055547 | A | 2/2004 |
| JP | 2004504580 | A | 2/2004 |
| JP | 3588469 | B2 | 11/2004 |
| JP | 2004332069 | A | 11/2004 |
| JP | 2005036897 | A | 2/2005 |
| JP | 2005050624 | A | 2/2005 |
| JP | 2005106350 | A | 4/2005 |
| JP | 2005516647 | A | 6/2005 |
| JP | 2005524067 | A | 8/2005 |
| JP | 2005300005 | A | 10/2005 |
| JP | 2005537918 | A | 12/2005 |
| JP | 2005537919 | A | 12/2005 |
| JP | 2005538149 | A | 12/2005 |
| JP | 2005538159 | A | 12/2005 |
| JP | 2006501871 | A | 1/2006 |
| JP | 2006504431 | A | 2/2006 |
| JP | 2006219557 | A | 8/2006 |
| JP | 2006-524494 | | 11/2006 |
| JP | 2007057532 | A | 3/2007 |
| JP | 2007512880 | A | 5/2007 |
| JP | 2007516015 | A | 6/2007 |
| JP | 2007522900 | A | 8/2007 |
| JP | 2008035742 | A | 2/2008 |
| JP | 2008509907 | A | 4/2008 |
| JP | 2008511175 | | 4/2008 |
| JP | 2008518614 | A | 6/2008 |
| JP | 2008249003 | A | 10/2008 |

(56) References Cited

FOREIGN PATENT DOCUMENTS

| | | | |
|---|---|---|---|
| JP | 2008311058 | A | 12/2008 |
| JP | 2009501537 | A | 1/2009 |
| JP | 2009509523 | A | 3/2009 |
| JP | 2009087703 | A | 4/2009 |
| JP | 2009537119 | A | 10/2009 |
| JP | 2009537120 | A | 10/2009 |
| JP | 2010041354 | | 2/2010 |
| JP | 2010506594 | A | 3/2010 |
| JP | 2010178730 | A | 8/2010 |
| JP | 2010526553 | A | 8/2010 |
| JP | 2010213579 | A | 9/2010 |
| JP | 2010535530 | A | 11/2010 |
| JP | 2011058538 | A | 3/2011 |
| JP | 2011509667 | A | 3/2011 |
| JP | 2011515080 | A | 5/2011 |
| JP | 2011515093 | A | 5/2011 |
| JP | 2011113977 | A | 6/2011 |
| JP | 2011518567 | A | 6/2011 |
| JP | 2011135901 | A | 7/2011 |
| JP | 2011525366 | A | 9/2011 |
| JP | 2012506263 | A | 3/2012 |
| JP | 2012529936 | | 11/2012 |
| JP | 2012249854 | A | 12/2012 |
| JP | 2013054873 | A | 3/2013 |
| JP | 2013073939 | A | 4/2013 |
| JP | 5193668 | B2 | 5/2013 |
| JP | 5217980 | B2 | 6/2013 |
| JP | 2013150593 | A | 8/2013 |
| JP | 2014519586 | A | 8/2014 |
| JP | 2014525251 | A | 9/2014 |
| JP | 2014-526275 | | 10/2014 |
| JP | 2014527606 | A | 10/2014 |
| JP | 2014229498 | A | 12/2014 |
| JP | 2014533513 | A | 12/2014 |
| JP | 2015503336 | | 2/2015 |
| JP | 2015503337 | | 2/2015 |
| JP | 2015504667 | A | 2/2015 |
| JP | 2015060837 | | 3/2015 |
| JP | 2015506170 | | 3/2015 |
| JP | 2015508287 | | 3/2015 |
| JP | 2015-509706 | | 4/2015 |
| JP | 2015098645 | A | 5/2015 |
| JP | 2015513922 | A | 5/2015 |
| JP | 2015513970 | A | 5/2015 |
| JP | 2015531601 | A | 11/2015 |
| JP | 2016036222 | A | 3/2016 |
| JP | 2016524777 | A | 8/2016 |
| JP | 2016525341 | A | 8/2016 |
| JP | 2016189525 | A | 11/2016 |
| JP | 2017515490 | | 6/2017 |
| JP | 2017520234 | A | 7/2017 |
| JP | 2017526381 | | 9/2017 |
| JP | 6217980 | B2 | 10/2017 |
| JP | 2017533732 | A | 11/2017 |
| JP | 2018520664 | | 8/2018 |
| JP | 2019065344 | A | 4/2019 |
| JP | 2020182327 | A | 11/2020 |
| JP | 2021508438 | A | 3/2021 |
| JP | 2021078359 | A | 5/2021 |
| KR | 950700692 | A | 2/1995 |
| KR | 960702734 | A | 5/1996 |
| KR | 0178388 | B1 | 2/1999 |
| KR | 19990081973 | A | 11/1999 |
| KR | 100286488 | B1 | 4/2001 |
| KR | 100385395 | | 8/2003 |
| KR | 100393327 | B1 | 10/2003 |
| KR | 200350504 | Y1 | 5/2004 |
| KR | 2004/0068292 | | 7/2004 |
| KR | 200370872 | Y1 | 12/2004 |
| KR | 100636287 | B1 | 10/2006 |
| KR | 20070038350 | A | 4/2007 |
| KR | 100757450 | B1 | 9/2007 |
| KR | 20070096027 | | 10/2007 |
| KR | 20080060218 | A | 7/2008 |
| KR | 100971178 | | 7/2010 |
| KR | 20100135865 | A | 12/2010 |
| KR | 20120003484 | U | 5/2012 |
| KR | 20120104533 | A | 9/2012 |
| KR | 20130029697 | A | 3/2013 |
| KR | 20130006714 | U | 11/2013 |
| KR | 20140068808 | | 6/2014 |
| KR | 20140123487 | | 10/2014 |
| KR | 20150143877 | A | 12/2015 |
| KR | 20150143891 | A | 12/2015 |
| MX | 2009001096 | A | 3/2009 |
| MX | 2014011283 | A | 10/2014 |
| RU | 2066337 | C1 | 9/1996 |
| RU | 2098446 | C1 | 12/1997 |
| RU | 2135054 | C1 | 8/1999 |
| RU | 2285028 | C1 | 10/2006 |
| RU | 2311859 | C2 | 12/2007 |
| RU | 2336001 | C2 | 10/2008 |
| RU | 2349234 | C2 | 3/2009 |
| RU | 89927 | U1 | 12/2009 |
| RU | 94815 | U1 | 6/2010 |
| RU | 103281 | U1 | 4/2011 |
| RU | 115629 | U1 | 5/2012 |
| RU | 122000 | U1 | 11/2012 |
| RU | 122254 | U1 | 11/2012 |
| RU | 124120 | U1 | 1/2013 |
| RU | 132318 | U1 | 9/2013 |
| RU | 2509516 | C2 | 3/2014 |
| RU | 2015105675 | A | 8/2015 |
| RU | 2013155697 | A | 10/2015 |
| RU | 2614615 | C2 | 3/2017 |
| RU | 2016150117 | A | 6/2018 |
| RU | 2687811 | C1 | 5/2019 |
| SE | 7415242 | A | 6/1975 |
| SE | 502503 | L | 10/2006 |
| TW | 274507 | | 4/1996 |
| TW | 201325481 | | 7/2013 |
| WO | WO-8404698 | A1 | 12/1984 |
| WO | WO-8601730 | A1 | 3/1986 |
| WO | 8602528 | A1 | 5/1986 |
| WO | WO-9013326 | A1 | 11/1990 |
| WO | 9406314 | A1 | 3/1994 |
| WO | WO-9409842 | A1 | 5/1994 |
| WO | 9418860 | A1 | 9/1994 |
| WO | WO-9527411 | A1 | 10/1995 |
| WO | 9632854 | A2 | 10/1996 |
| WO | WO-9639880 | A1 | 12/1996 |
| WO | 9748293 | A1 | 12/1997 |
| WO | WO-9805906 | A1 | 2/1998 |
| WO | 9817131 | A1 | 4/1998 |
| WO | WO-9823171 | A1 | 6/1998 |
| WO | WO-9835552 | A1 | 8/1998 |
| WO | WO-9914402 | A1 | 3/1999 |
| WO | WO-9947273 | A2 | 9/1999 |
| WO | WO-9947806 | A2 | 9/1999 |
| WO | 0009188 | A1 | 2/2000 |
| WO | 0021598 | A1 | 4/2000 |
| WO | 0028842 | A1 | 5/2000 |
| WO | WO-0028843 | A1 | 5/2000 |
| WO | 0045878 | A2 | 8/2000 |
| WO | 0050111 | A1 | 8/2000 |
| WO | WO-0104548 | A1 | 1/2001 |
| WO | WO-0140717 | A1 | 6/2001 |
| WO | WO-0163183 | A1 | 8/2001 |
| WO | 0167819 | A1 | 9/2001 |
| WO | WO-0205620 | A2 | 1/2002 |
| WO | WO-0205640 | A1 | 1/2002 |
| WO | WO-0206421 | A1 | 1/2002 |
| WO | WO-0207656 | A2 | 1/2002 |
| WO | WO-0224262 | A2 | 3/2002 |
| WO | 02051468 | A2 | 7/2002 |
| WO | WO-02051466 | A2 | 7/2002 |
| WO | 02058747 | A1 | 8/2002 |
| WO | WO-02096532 | A1 | 12/2002 |
| WO | WO-02098389 | A1 | 12/2002 |
| WO | 03012565 | A1 | 2/2003 |
| WO | 03028409 | A1 | 4/2003 |
| WO | WO-03037412 | A2 | 5/2003 |
| WO | 03050405 | A1 | 6/2003 |
| WO | WO-03049792 | A1 | 6/2003 |

(56) References Cited

FOREIGN PATENT DOCUMENTS

| | | | |
|---|---|---|---|
| WO | 03056948 | A1 | 7/2003 |
| WO | 03059413 | A2 | 7/2003 |
| WO | 03070031 | A1 | 8/2003 |
| WO | 03083283 | A1 | 10/2003 |
| WO | WO-03083007 | A2 | 10/2003 |
| WO | 03101454 | A1 | 12/2003 |
| WO | 03103387 | A2 | 12/2003 |
| WO | 2004022128 | A2 | 3/2004 |
| WO | 2004022242 | A1 | 3/2004 |
| WO | 2004022243 | A1 | 3/2004 |
| WO | 2004089126 | A1 | 10/2004 |
| WO | WO-2004098324 | A2 | 11/2004 |
| WO | WO-2004104491 | A2 | 12/2004 |
| WO | WO-2004104492 | A2 | 12/2004 |
| WO | WO-2004104493 | A2 | 12/2004 |
| WO | 2005106350 | A2 | 11/2005 |
| WO | WO-2006022714 | A1 | 3/2006 |
| WO | 2006082571 | A1 | 8/2006 |
| WO | 2007012007 | A2 | 1/2007 |
| WO | 2007017482 | A1 | 2/2007 |
| WO | 2007040941 | A1 | 4/2007 |
| WO | WO-2007042941 | A2 | 4/2007 |
| WO | WO-2007051163 | A2 | 5/2007 |
| WO | WO-2007054167 | A1 | 5/2007 |
| WO | WO-2007078273 | A1 | 7/2007 |
| WO | WO-2007090594 | A1 | 8/2007 |
| WO | WO-2007098337 | A2 | 8/2007 |
| WO | 2007109811 | A2 | 9/2007 |
| WO | 2007113617 | A2 | 10/2007 |
| WO | WO-2007116915 | A1 | 10/2007 |
| WO | 2007131449 | A1 | 11/2007 |
| WO | 2007131450 | A1 | 11/2007 |
| WO | 2007141668 | A2 | 12/2007 |
| WO | WO-2008015441 | A1 | 2/2008 |
| WO | WO-2008029381 | | 3/2008 |
| WO | 2008038144 | A2 | 4/2008 |
| WO | WO-2008051909 | A1 | 5/2008 |
| WO | WO-2008069883 | A1 | 6/2008 |
| WO | 2008108889 | A1 | 9/2008 |
| WO | 2008121610 | A1 | 10/2008 |
| WO | 2009001082 | A1 | 12/2008 |
| WO | WO-2008151777 | A2 | 12/2008 |
| WO | WO-2009006521 | A2 | 1/2009 |
| WO | 2009015410 | A1 | 2/2009 |
| WO | 2009022232 | A2 | 2/2009 |
| WO | WO-2009042955 | A2 | 4/2009 |
| WO | WO-2009079641 | A2 | 6/2009 |
| WO | WO-2009092862 | A1 | 7/2009 |
| WO | WO-2009118085 | A1 | 10/2009 |
| WO | 2009132793 | A1 | 11/2009 |
| WO | WO-2009152651 | A1 | 12/2009 |
| WO | WO-2009155957 | A1 | 12/2009 |
| WO | WO-2009156181 | A2 | 12/2009 |
| WO | WO-2010017586 | A1 | 2/2010 |
| WO | 2010045670 | A1 | 4/2010 |
| WO | 2010045671 | A1 | 4/2010 |
| WO | WO-2010041354 | A1 | 4/2010 |
| WO | WO-2010047389 | A1 | 4/2010 |
| WO | WO-2010053467 | A1 | 5/2010 |
| WO | WO-2010060537 | A1 | 6/2010 |
| WO | 2010073018 | A1 | 7/2010 |
| WO | 2010102832 | A1 | 9/2010 |
| WO | WO-2010107613 | A1 | 9/2010 |
| WO | 2010118644 | A1 | 10/2010 |
| WO | 2010133342 | A1 | 11/2010 |
| WO | 2011045609 | A1 | 4/2011 |
| WO | 2011050943 | A1 | 5/2011 |
| WO | 2011050964 | A1 | 5/2011 |
| WO | 2011063970 | A1 | 6/2011 |
| WO | 2011068020 | A1 | 6/2011 |
| WO | 2011070785 | A1 | 6/2011 |
| WO | 2011079932 | A1 | 7/2011 |
| WO | WO-2011088132 | A1 | 7/2011 |
| WO | WO-2011101164 | A1 | 8/2011 |
| WO | 2011109849 | A1 | 9/2011 |
| WO | WO-2011109304 | A2 | 9/2011 |
| WO | WO-2011117580 | A2 | 9/2011 |
| WO | 2012014490 | A1 | 2/2012 |
| WO | 2012025496 | A1 | 3/2012 |
| WO | WO-2012054973 | A1 | 5/2012 |
| WO | WO 2012072770 | | 6/2012 |
| WO | WO-2012072790 | A1 | 6/2012 |
| WO | WO-2012078865 | A2 | 6/2012 |
| WO | WO-2012100430 | A1 | 8/2012 |
| WO | 2013022936 | A1 | 2/2013 |
| WO | 2013034453 | A1 | 3/2013 |
| WO | 2013034454 | A1 | 3/2013 |
| WO | 2013034459 | A1 | 3/2013 |
| WO | 2013034460 | A1 | 3/2013 |
| WO | WO-2013034455 | A1 | 3/2013 |
| WO | WO-2013034458 | A1 | 3/2013 |
| WO | 2013057185 | A1 | 4/2013 |
| WO | WO-2013076098 | A2 | 5/2013 |
| WO | 2013082173 | A1 | 6/2013 |
| WO | WO-2013098395 | A1 | 7/2013 |
| WO | WO-2013098405 | A2 | 7/2013 |
| WO | WO-2013098409 | A1 | 7/2013 |
| WO | WO-2013098410 | A2 | 7/2013 |
| WO | WO-2013102609 | A2 | 7/2013 |
| WO | 2013113612 | A1 | 8/2013 |
| WO | 2013116558 | A1 | 8/2013 |
| WO | 2013116572 | A1 | 8/2013 |
| WO | 2013131764 | A1 | 9/2013 |
| WO | 2013152873 | A1 | 10/2013 |
| WO | 2013160112 | A2 | 10/2013 |
| WO | 2013178767 | A1 | 12/2013 |
| WO | 2014012906 | A1 | 1/2014 |
| WO | 2014037794 | A2 | 3/2014 |
| WO | 2014045025 | A2 | 3/2014 |
| WO | 2014061477 | A1 | 4/2014 |
| WO | WO-2014048475 | A1 | 4/2014 |
| WO | WO-2014048745 | A1 | 4/2014 |
| WO | WO 2015068936 | | 5/2014 |
| WO | 2014130695 | A1 | 8/2014 |
| WO | 2014140320 | A1 | 9/2014 |
| WO | 2014150131 | A1 | 9/2014 |
| WO | WO-2014147114 | A1 | 9/2014 |
| WO | 2014201432 | A1 | 12/2014 |
| WO | 2015022321 | A1 | 2/2015 |
| WO | 2015052192 | A1 | 4/2015 |
| WO | WO 2015051646 | | 4/2015 |
| WO | 2015082649 | A1 | 6/2015 |
| WO | WO-2015082648 | A1 | 6/2015 |
| WO | WO-2015082651 | A1 | 6/2015 |
| WO | WO-2015082652 | A1 | 6/2015 |
| WO | 2015114328 | A1 | 8/2015 |
| WO | 2015140312 | A1 | 9/2015 |
| WO | WO-2015131058 | A1 | 9/2015 |
| WO | 2015165812 | A1 | 11/2015 |
| WO | 2015175568 | A1 | 11/2015 |
| WO | 2015177043 | A1 | 11/2015 |
| WO | 2015177252 | A1 | 11/2015 |
| WO | 2015177254 | A1 | 11/2015 |
| WO | 2015177256 | A1 | 11/2015 |
| WO | 2015177257 | A1 | 11/2015 |
| WO | WO 2015/177265 | | 11/2015 |
| WO | WO-2015177044 | A1 | 11/2015 |
| WO | WO-2015177045 | A1 | 11/2015 |
| WO | WO-2015177255 | A1 | 11/2015 |
| WO | WO-2015177263 | A1 | 11/2015 |
| WO | WO-2015177264 | A1 | 11/2015 |
| WO | WO-2015177294 | A1 | 11/2015 |
| WO | WO-2015198015 | A1 | 12/2015 |
| WO | WO-2016014652 | A1 | 1/2016 |
| WO | WO-2016075436 | A1 | 5/2016 |
| WO | WO-2016156500 | A1 | 10/2016 |
| WO | WO-2016184928 | A1 | 11/2016 |
| WO | WO-2016184929 | A1 | 11/2016 |
| WO | WO-2016184930 | A1 | 11/2016 |
| WO | WO-2016200815 | A2 | 12/2016 |
| WO | WO2017001819 | A1 | 1/2017 |
| WO | WO-2017005705 | A1 | 1/2017 |
| WO | WO-2017029268 | A1 | 2/2017 |
| WO | WO-2017029269 | A1 | 2/2017 |

(56) References Cited

FOREIGN PATENT DOCUMENTS

| | | | |
|---|---|---|---|
| WO | WO-2017029270 | A1 | 2/2017 |
| WO | WO-2017036950 | A2 | 3/2017 |
| WO | WO-2017036955 | A2 | 3/2017 |
| WO | WO-2017036959 | A1 | 3/2017 |
| WO | WO-2017068094 | A1 | 4/2017 |
| WO | WO-2017068098 | A1 | 4/2017 |
| WO | WO-2017068099 | A1 | 4/2017 |
| WO | 2017072145 | A1 | 5/2017 |
| WO | 2017085242 | A1 | 5/2017 |
| WO | 2017149093 | A1 | 9/2017 |
| WO | 2017194769 | A1 | 11/2017 |
| WO | 2017205692 | A1 | 11/2017 |
| WO | WO-2017207581 | A1 | 12/2017 |
| WO | WO-2018002083 | A1 | 1/2018 |
| WO | 2018073376 | A1 | 4/2018 |
| WO | WO-2018178095 | A1 | 10/2018 |
| WO | 2020047417 | A1 | 3/2020 |

OTHER PUBLICATIONS

Application and File History for U.S. Appl. No. 14/840,703, filed Aug. 31, 2015, inventors Wilke et al.
Application and File History for U.S. Appl. No. 14/840,731, filed Aug. 31, 2015, inventors Blandino et al.
Application and File History for U.S. Appl. No. 14/840,751, filed Aug. 31, 2015, inventors Blandino et al.
Application and File History for U.S. Appl. No. 14/840,854, filed Aug. 31, 2015, inventors Blandino et al.
Application and File History for U.S. Appl. No. 14/840,972, filed Aug. 31, 2015, inventors Wilke et al.
Application and File History for U.S. Appl. No. 14/927,529, filed Oct. 30, 2015, inventors Kaufman et al.
Application and File History for U.S. Appl. No. 14/927,532, filed Oct. 30, 2015, inventors Blandino et al.
Application and File History for U.S. Appl. No. 14/927,537, filed Oct. 30, 2015, inventors Kaufman et al.
Application and File History for U.S. Appl. No. 14/927,539, filed Oct. 30, 2015, inventors Blandino et al.
Application and File History for U.S. Appl. No. 14/927,551, filed Oct. 30, 2015, inventors Blandino et al.
Application and File History for U.S. Appl. No. 14/927,556, filed Oct. 30, 2015, inventors Blandino et al.
Chaplin M., "Hydrocolloids and Gums," retrieved from http://www1.lsbu.ac.uk/water/hydrocolloids_gums.html, Established in 2001, 7 pages.
CN203762288U, "Atomization Device Applicable to Solid Tobacco Materials and Electronic Cigarette," retrieved from Google Patents https://patents.google.com/patent/CN203762288U/en on Jan. 12, 2018, 10 pages.
English translation of CN101390659 dated Aug. 3, 2017, 8 pages.
First Office Action dated Dec. 3, 2015 for Chinese Application No. 201380021387.2, 20 pages.
First Office Action dated May 5, 2016 for Chinese Application No. 201380048636.7, 25 pages.
Ineos., "Typical Engineering Properties of High Density Polyethylene," Olefins and Polymers, USA, retrieved from https://www.ineos.com/globalassets/ineos-group/businesses/ineos-olefins-and-polymers-usa/products/technical-information--patents/ineos-typical-engineering-properties-of-hdpe.pdf, Accessed Dec. 4, 2018, 2 pages.
International Preliminary Report on Patentability for Application No. PCT/EP2013/068797, dated Mar. 31, 2015, 5 pages.
International Preliminary Report on Patentability for Application No. PCT/EP2016/070176, dated Mar. 15, 2018, 12 pages.
International Preliminary Report on Patentability for Application No. PCT/EP2016/070178, dated Mar. 15, 2018, 8 pages.
International Preliminary Report on Patentability for Application No. PCT/EP2016/070185, dated Mar. 15, 2018, 11 pages.
International Preliminary Report on Patentability for Application No. PCT/EP2016/070188, dated Mar. 15, 2018, 8 pages.
International Preliminary Report on Patentability for Application No. PCT/EP2016/070191, dated Mar. 15, 2018, 8 pages.
International Preliminary Report on Patentability for Application No. PCT/EP2016/075734, dated May 11, 2018, 7 pages.
International Preliminary Report on Patentability for Application No. PCT/EP2016/075739, dated Jan. 16, 2018, 7 pages.
International Preliminary Report on Patentability for Application No. PCT/GB2013/052433, dated Mar. 24, 2015, 9 pages.
International Search Report and Written Opinion for Application No. PCT/EP2013/068797, dated Dec. 9, 2013, 8 pages.
International Search Report and Written Opinion for Application No. PCT/EP2016/070176, dated Apr. 19, 2017, 21 pages.
International Search Report and Written Opinion for Application No. PCT/EP2016/070178, dated Dec. 14, 2016, 10 pages.
International Search Report and Written Opinion for Application No. PCT/EP2016/070185, dated Apr. 4, 2017, 16 pages.
International Search Report and Written Opinion for Application No. PCT/EP2016/070188, dated Dec. 13, 2016, 10 pages.
International Search Report and Written Opinion for Application No. PCT/EP2016/070191, dated Dec. 13, 2016, 10 pages.
International Search Report and Written Opinion for Application No. PCT/EP2016/075734, dated Apr. 6, 2017, 12 pages.
International Search Report and Written Opinion for Application No. PCT/EP2016/075739, dated Feb. 24, 2017, 10 pages.
International Search Report and Written Opinion for Application No. PCT/GB2013/052433, dated Jun. 30, 2014, 16 pages.
Iorga A., et al., "Low Curie Temperature in Fe—Cr—Ni—Mn Alloys," U.P.B. Sci.Bull., Series B, vol. 73 (4), 2011, pp. 195-202.
jrank.org, "Heat Capacity—Heat Capacity and Calorimetry, Heat Capacity and the Law of Conservation of Energy-Significance of the High Heat Capacity of Water," retrieved from https://science.jrank.org/pages/3265/Heat-Capacity.html, Accessed Jun. 15, 2017, 2 pages.
NeoMax Materials Co., Ltd., "NeoMax MS-135," retrieved from http://www.neomax-materials.co.jp/eng/pr0510.htm, as accessed on Oct. 30, 2015, 2 pages.
Notification of Reasons for Refusal dated Feb. 1, 2016 for Japanese Application No. 2015531544, 5 pages.
Office Action dated Feb. 19, 2019 for Canadian Application No. 2995315, 4 pages.
Office Action dated Jan. 8, 2019 for Japanese Application No. 2017-075527, 15 pages.
Office Action dated Jan. 31, 2019 for Korean Application No. 10-2018-7006009, 17 pages.
Office Action dated Mar. 13, 2018 for Japanese Application No. 2017-075527, 10 pages.
Office Action dated Mar. 26, 2019 for Japanese Application No. 2018-506381, 11 pages.
Office Action dated Sep. 13, 2017 for Russian Application No. 2015106592/12, 6 pages.
Rasidek N.A.M., et al., "Effect of Temperature on Rheology Behaviour of Banana Peel Pectin Extracted Using Hot Compressed Water," Jurnal Teknologi (Sciences & Engineering), vol. 80 (3), Apr. 1, 2018, pp. 97-103.
Second Office Action dated Jan. 16, 2017 for Chinese Application No. 201380048636.7, 24 pages.
The Engineering Toolbox., "Specific Heats for Metals," retrieved from https://www.engineeringtoolbox.com/specific-heat-metals-d_152.html, 2003, 6 pages.
Todaka T., et al., "Low Curie Temperature Material for Induction Heating Self-Temperature Controlling System," Journal of Magnetism and Magnetic Materials, vol. 320 (20), Oct. 2008, pp. e702-e707.
UKIPO Search Report for UK Application No. GB1216621.1, dated Jan. 17, 2013 , 6 pages.
University of Illinois, "Scientific Principles," retrieved from http://matse1.matse.illinois.edu/ceramics/prin.html, Accessed Jun. 15, 2017, 13 pages.
European Extended Search Report, Application No. 19216472.1, dated Apr. 22, 2020, 13 pages.
Japanese Office Action, Application No. 2018-506381, dated Dec. 3, 2019, 7 pages.
Japanese Office Action, Application No. 2018-506381, dated Mar. 26, 2019, 11 pages.

(56) References Cited

OTHER PUBLICATIONS

Korean Office Action, Application No. 10-2018-7006009, dated Aug. 29, 2019, 9 pages.
Japanese Office Action, Application No. 2018-506575, dated Mar. 19, 2019 , 10 pages.
Korean Office Action, Application No. 10-2018-7006070, dated Feb. 7, 2019, 9 pages.
English Translation of Japanese Office Action, Application No. 2018-506565, dated Mar. 19, 2019, 4 pages.
English Translation of Japanese Office Action, Application No. 2018-521547, dated Jun. 25, 2019, 4 pages.
Canada Office Action, Application No. 3,003,514, dated Mar. 28, 2019, 6 pages.
English Translation of Japanese Office Action, Application No. 2018-519865, dated Jun. 25, 2019, 3 pages.
Japanese Office Action, Application No. 2018-506563, dated May 7, 2019, 4 pages.
Taiwan Office Action, Application No. 105127627, dated Dec. 19, 2019, 9 pages.
Chinese Office Action, Application No. 2016800498156, dated Oct. 21, 2019.
Japanese Office Action, Application No. 2018-506553, dated Mar. 19, 2019, 4 pages.
Japanese Office Action, Application No. 2018-506553, dated Nov. 5, 2018, 8 pages.
Application and File History for U.S. Appl. No. 14/428,626, filed Mar. 16, 2015, Inventors Hatrick et al..
Application and File History for U.S. Appl. No. 15/754,801, filed Feb. 23, 2018, inventors Blandino et al.
Application and File History for U.S. Appl. No. 15/754,812, filed Feb. 23, 2018, Inventors Blandino et al.
Application and File History for U.S. Appl. No. 15/754,818, filed Feb. 23, 2018, Inventors Blandino et al.
Application and File History for U.S. Appl. No. 15/754,823, filed Feb. 23, 2018, Inventors Blandino et al.
Application and File History for U.S. Appl. No. 15/754,837, filed Feb. 23, 2018, Inventors Wilke et al.
Application and File History for U.S. Appl. No. 15/772,382, filed Apr. 30, 2018, Inventors Kaufman Wilke et al.
Application and File History for U.S. Appl. No. 15/772,386, filed Apr. 30, 2018, Inventors Blandino et al.
CN203762288, Machine Translation, retrieved Online from Espacenet on Aug. 13, 2020, (http://worldwide.espacenet.com), 5 pages.
European Notice of Opposition for Application No. 13759537 dated Jan. 23, 2020, 83 pages.
Extended European Search Report for Application No. 19164405.3 dated Aug. 28, 2019, 6 pages.
Extended European Search Report for Application No. 19165045.6 dated Sep. 6, 2019, 7 Pages.
Extended European Search Report for Application No. 20179569.7 dated Oct. 2, 2020, 10 pages.
First Office Action dated Nov. 1, 2019 for Chinese Application No. 2016800498584, 6 pages.
Gaohe Q., "Chinese Scientific Information," vol. 10, May 15, 2010, pp. 132-133.
International Preliminary Report on Patentability for Application No. PCT/EP2016/070182, dated Mar. 15, 2018, 8 pages.
International Search Report and Written Opinion for Application No. PCT/EP2016/070182, dated Dec. 12, 2016, 11 pages.
Office Action and Search Report dated May 6, 2020 for Chinese Application No. 2016800498156 filed Aug. 26, 2016, 7 pages.
Office Action and Search Report dated Feb. 25, 2020 for Taiwan Application No. 105127626 filed Aug. 29, 2016, 14 pages.
Office Action dated Oct. 18, 2019 for Chinese Application No. 201680049874.3, 18 pages.
Office Action dated Aug. 5, 2020 for Chinese Application No. 201680049874.3, 6 pages.
Office Action for Chinese Application No. 20168049858 dated Jul. 3, 2020, 35 pages.
Office Action dated Sep. 1, 2020 for Japanese Application No. 2018-506381, 25 pages.
Office Action dated Nov. 12, 2019 for Japanese Application No. 2018-506575, 8 pages.
Office Action dated Sep. 12, 2019 for Chilean Application No. 201800521, 8 pages.
Office Action dated Feb. 13, 2019 for Japanese Application No. 2018-507624, 32 pages.
Office Action dated Feb. 14, 2019 for Canadian Application No. 2996835, 3 pages.
Office Action dated Sep. 15, 2020 for Japanese Application No. 2019-118784, 14 pages.
Office Action dated Sep. 17, 2020 for Canadian Application No. 2996342, 4 pages.
Office Action dated Jun. 19, 2020 for Canadian Application No. 2995315, 4 pages.
Office Action dated Apr. 27, 2020 for the Brazilian Application No. 112017028539.8, 5 pages.
Office Action dated Oct. 29, 2019 for Japanese Application No. 2018-507624, 29 pages.
Office Action dated Sep. 29, 2020 for Japanese Application No. 2018-506563, 5 pages.
Office Action dated Dec. 3, 2019 for Japanese Application No. 2018-521547, 4 pages.
Office Action dated Nov. 4, 2019 for Chinese Application No. 201680049679.0, 12 pages.
Office Action dated Nov. 5, 2019 for Japanese Application No. 2018-506565, 12 pages.
Office Action dated Feb. 8, 2019 for Korean Application No. 10-2018-7006077, 15 pages.
Office Action dated Jun. 9, 2020 for Chinese Application No. 201680061969.7, 15 pages.
"Polyetheretherketone—Online Catalog Source," Retrieved from http://www.goodfellow.com/A/Polyethertherketone.html, Jan. 17, 2020. 4 pages.
Shuisheng X., et al., "Semisolid processing technology," Jinshu Bangutai Jiagong Jishu, 2012, ISBN 978-7-5024-5935-2, 10 pages.
Extended European Search Report for Application No. 20205043.1, dated May 4, 2021, 10 pages.
Extended European Search Report for Application No. 20205544.8 dated Jun. 14, 2021, 9 pages.
Extended European Search Report for Application No. EP20205075.3, dated Jan. 27, 2021, 11 pages.
International Search Report and Written Opinion for Application No. PCT/EP2016/085686, dated May 9, 2019, 16 pages.
Notification of Reasons for Refusal dated May 18, 2021 for Japanese Application No. 2020126181, 8 pages.
Office Action dated Feb. 15, 2021 for Ukraine Application No. 201801751, 4 pages.
Office Action dated Feb. 16, 2021 for Ukraine Application No. 201801846, 3 pages.
Office Action dated Jan. 28, 2021 for Chinese Application No. 201680049874.3, 6 pages.
Office Action for Chinese Application No. 201680049479.5, dated Feb. 4, 2021, 8 pages.
Office Action for Japanese Application No. 2018-506381, dated Apr. 13, 2021, 5 pages.
Office Action for Malaysian Application No. PI2018700428, dated Mar. 1, 2021, 3 pages.
Office Action for Russian Application No. 2020135756, dated Jun. 30, 2021, 9 pages.
Office Action dated Sep. 17, 2020 for Canadian Application No. 2995315, 4 pages.
Office action dated Sep. 8, 2020 for Japanese Application No. 2018-507624, 7 pages.
Partial European Search Report for Application No. 20205057.1, dated Apr. 29, 2021, 16 pages.
CN-203952405-U, "Tobacco Suction System Based on Electromagnetic Heating—Google Patents," (Machine Translation) [online], Retrieved on Nov. 29, 2021, Retrieved from Google Patents (https://patents.google.com/), 2014, 4 pages.
Extended European Search Report for Application No. 20205057.1, dated Oct. 19, 2021, 20 pages.

(56) References Cited

OTHER PUBLICATIONS

Jinshu Bangutai Jiagong Jishu, Metallurgical Industry Press, 10 pages, dated Jun. 30, 2012.
Notice of Reasons for Rejection for Japanese Application No. 2020-182759, dated Oct. 12, 2021, 5 pages.
Office Action for Chinese Application No. 201680049858.4, dated Jul. 1, 2021, 13 pages.
Office Action for Japanese Application No. 2020-067569, dated Nov. 9, 2021, 6 pages.
Office Action for Japanese Application No. 2020-126181, dated Nov. 30, 2021, 4 pages.
Office Action for Japanese Application No. 2020-183056, dated Nov. 9, 2021, 14 pages.
Office Action for Russian Application No. 2020121132, dated Aug. 6, 2021, 11 pages.
Office Action dated Jun. 8, 2021 for Japanese Application No. 2020-526233, 22 pages.
Fourth Office Action and Search Report for Chinese Application No. 2016800498584 dated Jan. 6, 2022, 21 pages.
Notice of Reasons for Rejection for Japanese Application No. 2020-182762, dated Dec. 7, 2021, 9 pages.
Communication pursuant to Article 94(3) EPC for Application No. 16766233.7 dated Mar. 7, 2022, 16 pages.
Communication Pursuant to Article 94(3) EPC for Application No. 16766234.5 dated Mar. 7, 2022, 4 pages.
Decision of Rejection dated Apr. 15, 2022 for Chinese Application No. 20168009479.5, 7 pages.
Decision to Grant a Patent dated Apr. 5, 2022 for Japanese Application No. 2020-182759, 5 pages.
Extended European Search Report for Application No. 21170804.5, dated Feb. 21, 2022, 13 pages.
Extended European Search Report for Application No. 21192233.1, dated Dec. 9, 2021, 11 pages.
Fourth Office Action and Search Report for Chinese Application No. 201680049479.5 dated Nov. 18, 2021, 20 pages.
Notice of Reasons for Refusal dated Nov. 2, 2021 for Japanese Application No. 2020-182712, 6 pages.
Notice of Reasons for Refusal dated Jan. 25, 2022 for Japanese Application No. 2020-183045, 9 pages.
Notice of Reasons for Rejection for Japanese Application No. 2020-181533, dated Apr. 26, 2022, 3 pages.
Notice of Reasons for Rejection dated Jan. 19, 2022 for Japanese Application No. 2020-183046, 6 pages.
Notice of Reasons for Rejection dated Apr. 26, 2022 for Japanese Application No. 2022-013252, 4 pages.
Office Action for Brazilian Application No. 112018004103-3, dated Feb. 1, 2022, 4 pages.
Office Action for Brazilian Application No. 112018004110-6, dated Jan. 31, 2022, 4 pages.
Office Action for Chinese Application No. 201680049858.4, dated Apr. 1, 2022, 15 pages.
Office Action for Russian Application No. 2018115288, dated Oct. 17, 2018, 7 pages.
Office Action dated Feb. 16, 2022 for Japanese Application No. 2019-118784, 28 pages.
Partial European Search Report for Application No. 21170791.4, dated Nov. 22, 2021, 16 pages.
Physics., "Analysis Series of Typical Examples of College Entrance Examination," Editorial Board, Heilongjiang Science and Technology Press, Dec. 31, 1995, 47 pages.
Search Report for Japanese Application No. 2020-521547, dated Jun. 14, 2019, 22 pages.
Written Opinion of the International Preliminary Examining Authority for Application No. PCT/EP2016/075739, dated Sep. 28, 2017, 6 pages.
Search Report dated Sep. 19, 2013 for Japanese Application No. 2011-532464, 116 pages.
Search Report dated Apr. 24, 2017 for Russian Application No. 2015146843, 3 pages.
Search Report dated Mar. 24, 2015 for Chinese Application No. 201280029767.6 filed Aug. 24, 2012, 6 pages.
Search Report dated Apr. 25, 2018 for Chinese Application No. 201610086101.4, 1 page.
Search Report dated Aug. 25, 2015 for Japanese Application No. 2014-179732, 10 pages.
Search Report dated Oct. 25, 2017 for Japanese Application No. 2016-864977, 19 pages.
Search Report dated Apr. 29, 2019 for Russian Application No. 2018137501, 12 pages.
Second Office Action dated Aug. 20, 2013 for Chinese Application No. 200980152395.4, 16 pages.
Summons to Attend Oral Proceedings pursuant to Rule 115(1) EPC mailed May 24, 2022 for European Application No. 18157257.9, 16 pages.
The opposition to petition not to grant of a patent for the Vietnam Application No. 1-2014-03877, mailed on Apr. 27, 2018, 35 pages.
Translation of Office Action dated Mar. 25, 2019 for Chinese Application No. 201610804046.8, 17 pages.
Vietnam Opposition for Application No. PCT/EP2013/057539, dated Jun. 29, 2018, 6 pages.
Virginia R., "A Summary of Findings and Recommendations for the Flexible Heater," Sep. 19, 1990, 8 pages.
Warrier M., et al., "Effect of the Porous Structure of Graphite on Atomic Hydrogen Diffusion and Inventory," Nucl. Fusion, vol. 47, 2007, pp. 1656-1663.
Written Opinion for Application No. PCT/EP2012/066485, dated Oct. 15, 2013, 6 pages.
Written Opinion for Application No. PCT/EP2015/064595, dated Jan. 5, 2016, 11 pages.
Written Opinion for Application No. PCT/GB2015/051213, dated Jul. 16, 2015, 9 pages.
Written Opinion of the International Preliminary Examining Authority for Application No. PCT/EP2015/064595, dated Jun. 13, 2016, 8 pages.
Application and File History for U.S. Appl. No. 15/991,512, filed May 29, 2018, inventors Abramov et al.
Application and File History for U.S. Appl. No. 15/470,078, filed Mar. 27, 2017, inventor Buchberger.
Application and File History for U.S. Appl. No. 15/470,089, filed Mar. 27, 2017, inventor Buchberger.
Application and File History for U.S. Appl. No. 15/470,095, filed Mar. 27, 2017, inventor Buchberger.
Application and File History for U.S. Appl. No. 14/899,629, filed Dec. 18, 2015, inventors Brereton et al.
Application and File History for U.S. Appl. No. 14/902,663, filed Jan. 4, 2016, inventors Harding et al.
Application and File History for U.S. Appl. No. 14/962,817, filed Dec. 8, 2015, inventors Egoyants et al.
Application and File History for U.S. Appl. No. 15/437,522, filed Feb. 21, 2017, inventors Abramov et al.
Application and File History for U.S. Appl. No. 13/583,381, filed Dec. 17, 2012, inventor Buchberger.
Application and File History for U.S. Appl. No. 14/127,133, filed Jul. 15, 2014, inventors Vasiliev et al.
Application and File History for U.S. Appl. No. 14/127,138, filed Feb. 10, 2014, inventors Egoyants et al.
Application and File History for U.S. Appl. No. 14/127,144, filed Mar. 31, 2014, inventors Egoyants et al.
Application and File History for U.S. Appl. No. 14/127,148, filed Mar. 12, 2014, inventors Egoyants et al.
Application and File History for U.S. Appl. No. 14/127,879, filed May 9, 2014, inventors Egoyants et al.
Application and File History for U.S. Appl. No. 14/343,368, filed Jun. 24, 2014, inventors Abramov et al.
Application and File History for U.S. Appl. No. 14/382,198, filed Aug. 29, 2014, inventors Saleem et al.
Application and File History for U.S. Appl. No. 15/379,946, filed Dec. 15, 2016, inventors Egoyants et al.
Application and File History for U.S. Appl. No. 15/437,517, filed Feb. 21, 2017, inventors Abramov et al.
Brief Communication for European Application No. 12750765.5, dated Aug. 31, 2021, 16 pages.

(56) References Cited

OTHER PUBLICATIONS

Chemical Engineering, "A Vacuum Insulation that is Ultrathin", Aug. 1, 2011, 5 pages.
Collier J.G. et al., "10.3 Mechanism of Evaporation and Condensation," Convective Boiling and Condensation, Third Edition, Clarendon Press, 1994, 6 pages.
Communication of a Notice of Opposition, dated Nov. 25, 2020, for European Patent Application No. 13716763.1, 26 pages.
Communication pursuant to Article 94(3) EPC for Application No. 20202673.8, dated Aug. 12, 2022, 05 pages.
Communication pursuant to Article 94(3) EPC for Application No. 22155465.2, dated Aug. 5, 2022, 7 pages.
Company Filtrona Richmond Inc., www.filtronaporoustechnologies.com, Nov. 19, 2018, 1 page.
Concept Group, "New Super Insulator form Concept Group Stops Heat Conduction in Tight Spaces," https://www.businesswire.com/news/home/20110610006023/en/New-Super- Insulator-Concept-Group-Stops-Heat, 2011, 5 pages.
Concept Group "Concept Group's New Thermal Insulator Thinner Than Human Hair", Jun. 29, 2011, 2 pages.
Concept Group, "Insulon® Thermal Barrier from Concept Group Blocks Heat with Hyper-Deep Vacuum™," Dec. 15, 2011, 1 page.
Davies, et al., "Metallic Foams: Their Production, Properties and Applications," Journal of Materials Science, 1983, vol. 18(7), pp. 1899-1911.
Decision to Grant a Patent dated Nov. 15, 2016 for Japanese Application No. 2015-506185 filed Apr. 11, 2013, 5 pages.
Decision to Grant a Patent dated May 22, 2018 for Japanese Application No. 2016-134648, 5 pages.
Decision to Grant dated Apr. 1, 2014 for Russian Application No. 2011120430, 16 pages.
Decision to Grant dated Aug. 5, 2014 for Japanese Application No. 2011-532464, 6 pages.
Diener Electronic, "Plasma Polymerization," The company Diener electronic GmbH+Co. KG, Retrieved on Oct. 17, 2017, 19 pages.
Dunn P.D., et al., "Heat Pipes," Fourth Edition, Pergamon, ISBN0080419038, 1994, 14 pages.
English Translation for Vietnam Opposition for Application No. PCT/EP2013/057539, dated Jun. 29, 2018, 29 pages.
European Extended Search Report for European Application No. 201576220, dated May 28, 2020, 12 pages.
European Search Report for European Application No. 22155465.2, dated Jul. 25, 2022, 4 pages.
Examination Report for Canadian Application No. 2,845,754, dated Aug. 19, 2021, 6 pages.
Examination Report for Canadian Application No. 2,845,754, dated Nov. 4, 2020, 5 pages.
Examination Report for Indian Application No. 201947043640, dated Aug. 11, 2020, 7 pages.
Examination Report for Indonesian Application No. P00201908524, dated Dec. 24, 2021, 5 pages.
Examination Report for Indonesian Application No. P00201908525, dated Dec. 24, 2021, 5 pages.
Examination Report for New Zealand Application No. 718007 dated Aug. 1, 2016, 4 pages.
Examination Report dated Jan. 9, 2019 for Philippines Application No. 1/2016/500805, 6 pages.
Examination Report dated Feb. 21, 2018 for Australian Application No. 2016204192, 7 pages.
Examination Report No. 1 for Australian Application No. 2020294182, dated Mar. 5, 2022, 3 pages.
Examination Report No. 1 for Australian Patent Application No. 2020235037, dated May 26, 2022, 3 pages.
Extended European Search Report for Application No. 15178588, dated Apr. 14, 2016, 2 pages.
Extended European Search Report for Application No. 15200661.5, dated May 18, 2016, 6 pages.
Office Action for Korean Application No. 10-2020-7017746, dated Feb. 10, 2022, 25 pages.
Office Action for Korean Application No. 10-2020-7031372, dated Dec. 9, 2020, 13 pages.
Office Action for Korean Application No. 10-2021-7013743, dated Nov. 22, 2021, 17 pages.
Office Action for Russian Application No. 2021112978, dated Oct. 28, 2021, 8 pages.
Office Action for Russian Application No. 2020 135 861, dated Apr. 13, 2021, 2 pages.
Office Action dated Jul. 4, 2018 for Russian Application No. 2018101312, 11 pages.
Office Action dated Apr. 5, 2019 for Korean Application No. 10-2018-7019884, 8 pages.
Office Action dated Sep. 5, 2022 for Russian Application No. 2019113858, 06 pages.
Office Action dated Sep. 6, 2017 for Korean Application No. 10-2017-7017425, 9 pages.
Office Action dated Sep. 6, 2017 for Korean Application No. 10-2017-7017430, 9 pages.
Office Action dated May 10, 2020 for Brazilian Application No. BR112014004818-5, 6 pages.
Office Action dated Jan. 11, 2019 for European Application No. 12750771.3, 44 pages.
Office Action dated May 11, 2018 for Korean Application No. 10-2017-7008071, 17 pages.
Office Action dated Sep. 11, 2017 for Chinese Application No. 201480024988.3, 10 pages.
Office Action dated May 12, 2017 for Russian Application No. 2016103729, filed Jul. 4, 2014, 15 pages.
Office Action dated Nov. 13, 2017 for Chinese Application No. 2013800472843, 13 pages.
Office Action dated Apr. 14, 2021 for Korean Application No. 10-2020-7036811, 10 pages.
Office Action dated Nov. 14, 2017 for Japanese Application No. 2016-522550, 6 pages.
Office Action dated Aug. 17, 2016 for Korean Application No. 10-2014-7032958, 13 pages.
Office Action dated Jan. 18, 2017 for Chinese Application No. 201480024978.X, 8 pages.
Office Action dated Jul. 18, 2018 for Chinese Application No. 201580022356.8, 15 pages.
Office Action dated Mar. 20, 2019 for Korean Application No. 10-2017-7008071, 2 pages.
Office Action dated Mar. 20, 2019 for Korean Application No. 10-2017-7008071, 3 pages.
Office Action dated May 20, 2022 for Russian Application No. 2021126540, 8 pages.
Office Action dated Sep. 22, 2017 for Russian Application No. 2014120213, 11 pages.
Office Action dated Apr. 24, 2019 for Chinese Application No. 201710413187.1, 16 pages.
Office Action dated Apr. 24, 2019 for Chinese Application No. 201710412726.X, 21 pages.
Office Action dated Jan. 24, 2019 for European Application No. 12750771.3, 40 pages.
Office Action dated Jan. 25, 2019 for European Application No. 12750771.3, 2 pages.
Office Action dated Jan. 25, 2019 for European Application No. 17189951.1, 4 pages.
Office Action dated Dec. 26, 2017 for Chinese Application No. 201480059966.0, 29 pages.
Office Action dated Oct. 26, 2016 for Russian Application No. 2014120213, 7 pages.
Office Action dated Jul. 27, 2018 for Korean Application No. 10-2013-7033866, 22 pages.
Office Action dated Jun. 27, 2017 for Japanese Application No. 2016-527295, 8 pages.
Office Action dated May 27, 2020 for Russian Application No. 2019134684, 8 pages.
Office Action dated Aug. 28, 2019 for Indian Application No. 201647014549, 6 pages.
Office Action dated Jul. 28, 2017 for Korean Application No. 10-2016-7010831, 11 pages.

(56) References Cited

OTHER PUBLICATIONS

Office Action dated Aug. 3, 2018 for Chinese Application No. 201580034981.4, 17 pages.
Office Action dated Dec. 30, 2016 for Chinese Application No. 201480024988.3, 26 pages.
Office Action dated Sep. 30, 2018 for Chinese Application No. 201610371843.1, 8 pages.
Office Action dated Jan. 31, 2017 for Japanese Application No. 2016-522550, 7 pages.
Office Action dated Dec. 4, 2018 for Japanese Application No. 2016-575543, 19 pages.
Office Action dated Jul. 4, 2017 for Japanese Application No. 2016-522550, 7 pages.
Office Action dated May 4, 2018 for Chinese Application No. 201610086101.4, 7 pages.
Office Action dated Dec. 5, 2017 for Japanese Application No. 2016-564977, 6 pages.
Office Action dated May 9, 2017 for Chinese Application No. 201480037049.2, 28 pages.
Office Action mailed for Japanese Application No. 2017-017842, dated Dec. 12, 2017, 6 pages.
Patio Kits Direct, "Insulated Roof Panels," DIY Alumawood Patio Cover Kits, dated Sep. 20, 2018, as available at https://www.patiokitsdirect.com/about-insulation, 2 pages.
Rudolph G., "The Influence of CO2 on the Sensory Characteristics of the Favor-System," 1987, Accessed at http://legacy.library.ucsf.edu/tid/sld5f100, 24 pages.
Search Report dated Apr. 14, 2017 for Japanese Application No. 2016-134648, 31 pages.
Extended European Search Report for U.S. Appl. No. 16/166,656, dated Oct. 11, 2016, 9 pages.
Extended European Search Report for Application No. 17189951.1, dated Jan. 4, 2018, 11 pages.
Extended European Search Report for Application No. 18157257.9, dated Jun. 28, 2018, 7 pages.
Extended European Search Report for Application No. 18205608.5, dated Jul. 12, 2019, 7 pages.
Extended European search report for Application No. 20157622.0, dated May 28, 2020, 12 pages.
Extended European Search Report for Application No. 20205071.2, dated Jul. 16, 2021, 8 pages.
Extended European Search Report for Application No. 21170791.4, dated Jun. 28, 2022, 15 pages.
Extended European Search Report for Application No. 21171022.3, dated Dec. 3, 2021, 8 pages.
Extended European Search Report for European Application No. 20206770.8, dated Mar. 3, 2021, 10 pages.
First Office Action dated Jun. 15, 2015 and Search Report dated Jun. 2, 2015 for Chinese Application No. 201280029784.X, filed Aug. 24, 2012, 27 pages.
First Office Action dated Dec. 3, 2012 for Chinese Application No. 200980152395.4, 16 pages.
Hegbom T., "Integrating Electrical Heating Elements in Appliance Design," cited in EPO Opposition for EP2871983, resulting in interlocutory decision.
International Preliminary Report on Patentability for Application No. PCT/AT2012/000017, dated Aug. 13, 2013, 5 pages.
International Preliminary Report on Patentability for Application No. PCT/EP2012/066484, dated Mar. 20, 2014, 7 pages.
International Preliminary Report on Patentability for Application No. PCT/EP2012/066485, dated Dec. 20, 2013, 12 pages.
International Preliminary Report on Patentability for Application No. PCT/EP2012/070647, dated Apr. 22, 2014, 8 pages.
International Preliminary Report on Patentability for Application No. PCT/EP2014/063785, dated Jun. 1, 2015, 12 pages.
International Preliminary Report on Patentability for Application No. PCT/EP2014/072828, dated May 12, 2016, 7 pages.
International Preliminary Report on Patentability for Application No. PCT/EP2015/064595, dated Oct. 25, 2016, 20 pages.
International Preliminary Report on Patentability for Application No. PCT/GB2014/051332, dated Nov. 12, 2015, 7 pages.
International Preliminary Report on Patentability for Application No. PCT/GB2014/051333, dated Aug. 5, 2015, 12 pages.
International Preliminary Report on Patentability for Application No. PCT/GB2014/051334, dated Nov. 12, 2015, 7 pages.
International Preliminary Report on Patentability for Application No. PCT/GB2015/051213, dated Jul. 14, 2016, 20 pages.
International Preliminary Report on Patentability for Application No. PCT/GB2017/051139, dated Aug. 6, 2018, 7 pages.
International Preliminary Report on Patentability for Application No. PCT/US2012/066523, dated Jun. 4, 2015, 6 pages.
International Preliminary Report on Patentability for Application No. PCT/EP2018/057835 dated Oct. 10, 2019, 15 pages.
International Preliminary Report on Patentability for Application No. PCT/EP2012/066486, dated Oct. 22, 2013, 10 pages.
International Preliminary Report on Patentability for Application No. PCT/EP2012/066523, dated Nov. 4, 2013, 9 pages.
International Preliminary Report on Patentability for Application No. PCT/EP2012/066524, dated Oct. 17, 2013, 11 pages.
International Preliminary Report on Patentability for Application No. PCT/EP2018/057834, dated Oct. 10, 2019, 13 pages.
International Search Report and Written Opinion for Application No. PCT/AT2012/000017, dated Jul. 3, 2012, 6 pages.
International Search Report and Written Opinion for Application No. PCT/EP2012/003103, dated Nov. 26, 2012, 6 pages.
International Search Report and Written Opinion for Application No. PCT/EP2012/070647, dated Feb. 6, 2013, 9 pages.
International Search Report and Written Opinion for Application No. PCT/EP2013/057539, dated Feb. 11, 2014, 16 pages.
International Search Report and Written Opinion for Application No. PCT/EP2014/063785, dated Oct. 30, 2014, 10 pages.
International Search Report and Written Opinion for Application No. PCT/EP2014/064365, dated Oct. 7, 2014, 11 pages.
International Search Report and Written Opinion for Application No. PCT/EP2014/072828, dated Jun. 16, 2015, 10 pages.
International Search Report and Written Opinion for Application No. PCT/EP2018/057835, dated Nov. 6, 2018, 26 pages.
International Search Report and Written Opinion for Application No. PCT/GB2014/051332, dated Jul. 21, 2014, 8 pages.
International Search Report and Written Opinion for Application No. PCT/GB2014/051333, dated Jul. 17, 2014, 10 pages.
International Search Report and Written Opinion for Application No. PCT/GB2014/051334, dated Jul. 21, 2014, 8 pages.
International Search Report and Written Opinion for Application No. PCT/GB2017/051139, dated Aug. 9, 2017, 14 pages.
International Search Report and Written Opinion for Application No. PCT/US2012/066523, dated May 29, 2013, 7 pages.
International Search Report and Written Opinion for Application No. PCT/EP2018/057834, dated Nov. 6, 2018, 20 pages.
International Search Report and Written Opinion for International Application No. PCT/EP2020/056231 dated Jul. 15, 2020, 11 pages.
International Search Report and Written Opinion for Application No. PCT/EP2012/066484, dated Jan. 9, 2013, 9 pages.
International Search Report and Written Opinion for Application No. PCT/EP2012/066486, dated Jan. 14, 2013, 3 pages.
International Search Report and Written Opinion for Application No. PCT/EP2012/066523, dated Jan. 9, 2013, 9 pages.
International Search Report and Written Opinion for Application No. PCT/EP2012/066524, dated Jan. 9, 2013, 8 pages.
International Search Report and Written Opinion for Application No. PCT/EP2012/066525, dated Jan. 9, 2013, 10 pages.
"Extended European Search Report received for European Patent Application No. 22189790.3, dated Jan. 24, 2023", 11 pages.
"International Preliminary Report on Patentability for Application No. PCT/EP2013/057539, dated Nov. 6, 2014", 10 pages.
"Office Action dated May 15, 2020 for the Brazilian Application No. 112018004103.3", 2 pages (English Translation Only).
"Office Action received for Chinese Patent Application No. 201680049874.3, dated Mar. 20, 2023", 14 pages (Official Copy Only).

(56) References Cited

OTHER PUBLICATIONS

"Office Action received for Chinese Patent Application No. 201811073829.9, dated Jan. 25, 2022", 9 pages (2 pages of English Translation and 7 pages of Official Copy).
"Office Action received for Chinese Patent Application No. 201811073829.9, dated May 8, 2021", 25 pages (10 pages of English Translation and 15 pages of Official Copy).
"Office Action received for Chinese Patent Application No. 201811073829.9, dated Sep. 15, 2021", 11 pages (5 pages of English Translation and 6 pages of Official copy).
"Office action received for Japanese Patent Application No. 2020-182327, dated Nov. 1, 2022", 4 pages (2 pages of English Translation and 2 pages of Official Copy).
"Office Action received for Malaysian Patent Application No. PI2018001351, dated Sep. 30, 2021", 4 pages (English Translation Only).
"Reasons for Refusal received for Japanese Patent Application No. 2020-181532, dated Jan. 17, 2023", 8 pages (4 pages of English Translation and 4 pages of Official Copy).
"Reasons for Rejection received for Japanese Patent Application No. 2021-078359, dated Jun. 28, 2022", 6 pages (3 pages of English Translation and 3 pages of Official Copy).
"Reasons for Rejection received for Korean Patent Application No. 10-2021-7020688, dated Sep. 14, 2023", 9 pages (4 pages of English Translation and 5 pages of Official Copy).
Chalapud, Mayra C. , "Pectin Films with Recovered Sunflower Waves Produced by Electrospraying", Membranes, vol. 12, 560, May 28, 2022, 17 pages.
Excellup , "Solid State", Available at <https://www.excellup.com/class_12/chemistry_12/SolidState4.aspx#:-:text=(a)%20Conductor%3A %20Solids%20having,considered%20as%20very%20good%20conductor>, 2023, 6 pages.
International Search Report and Written Opinion for Application No. PCT/EP2012/066485, dated Dec. 10, 2012, 10 pages.
International Search Report and Written Opinion for Application No. PCT/AT2011/000123, dated Jul. 18, 2011, 8 pages.
International Search Report for Application No. PCT/AT2009/000413, dated Jan. 25, 2010, 3 pages.
International Search Report for Application No. PCT/AT2009/000414, dated Jan. 26, 2010, 2 pages.
International Search Report for Application No. PCT/EP2015/064595, dated Jan. 5, 2016, 6 pages.
International Search Report for Application No. PCT/GB2015/051213, dated Jul. 16, 2015, 5 pages.
International Search Report for Application No. PCT/US2019/049076, dated Dec. 18, 2019, 4 pages.
Invitation to Pay Additional Fees for Application No. PCT/EP2018/057835, dated Jul. 17, 2018, 20 pages.
Invitation to Pay Additional Fees with Partial International Search for Application No. PCT/EP2018/057834 dated Jul. 13, 2018, 18 pages.
Korean Office Action, Application No. 1020197037986, dated Feb. 6, 2020, 11 pages.
Kynol, "Standard Specifications of Kynol™ Activated Carbon Fiber Products," Sep. 19, 2013, 2 pages.
Merriam-Webster, "Definition of Film", Retrieved from the Internet: https://www.merriam-webster.com/dictionary/Film on Sep. 17, 2019, 13 pages.
Minco Products Inc., "Thermofoil™ Heaters," Bulletin HS-202(D), Jul. 22, 2004, 60 pages.
National Plastic Heater, Sensor and Control Inc., "Kapton (Polyimide) Flexible Heaters," 2011, retrieved from https://www.kapton-silicone-flexible-heaters.com/products/kapton_polyimide_flexible_heaters.html on Feb. 23, 2018, 2 pages.
International Preliminary Report on Patentability for Application No. PCT/EP2012/066525, dated Mar. 20, 2014, 8 pages.
Notice of Opposition dated Mar. 7, 2017 for European Application No. 12750770.5, 22 pages.
Notice of Opposition Letter from EPO Opposition against the European Application No. 2358418, mailed Mar. 1, 2017, 60 pages.
Notice of Opposition mailed Sep. 20, 2021 for European Application No. 18157257.9 (EP3354144), 31 pages.
Notice of Reasons for Refusal for Japanese Application No. 2020-175447, dated Aug. 2, 2022, 23 pages.
Notice of Reasons for Rejection for Japanese Application No. 2020-181532, dated Jun. 21, 2022, 6 pages.
Notice of Reasons for Rejection dated May 23, 2017 for Japanese Application No. 2016134648, 18 pages.
Notice of Reasons for Rejection dated May 31, 2016 for Japanese Application No. 2015-137361, 6 pages.
Notice of Reasons for Rejection dated Oct. 7, 2013 for Japanese Application No. 2011532464, 6 pages.
Notice of Reasons for Rejection dated Sep. 8, 2015 for Japanese Application No. 2014179732, 5 pages.
Notification to Grant Patent Right for Invention dated Oct. 25, 2018 for Chinese Application No. 201610086101.4, 2 pages.
Office Action dated Jan. 23, 2019 for Korean Application No. 20187017575, 9 pages.
Office Action dated Jul. 8, 2016 for Chinese Application No. 201380021387.2, filed Apr. 11, 2011, 12 pages.
Office Action dated Sep. 25, 2018 for European Application No. 12750765.5 filed Aug. 24, 2012, 22 pages.
Office Action dated Sep. 26, 2018 for European Application No. 12750765.5 filed Aug. 24, 2012, 67 pages.
Office Action dated Sep. 29, 2015 for Japanese Application No. 2015-506185 filed Apr. 11, 2013, 5 pages.
Office Action dated Mar. 31, 2015 for Japanese Application No. 2014-519585 filed Aug. 24, 2012, 8 pages.
Office Action dated Apr. 7, 2015 for Japanese Application No. 2014-519586 filed Aug. 24, 2012, 10 pages.
Office Action and Search Report dated Apr. 27, 2015 for Chinese Application No. 201280030681.5, filed Aug. 24, 2012, 25 pages.
Office Action and Search Report dated Feb. 28, 2019 for Japanese Application No. 2018-088088, 25 pages.
Office Action dated Jun. 16, 2020 for Japanese Application No. 2019-065344, 10 pages.
Office Action for Canadian Application No. 3,057,903, dated Dec. 15, 2020, 6 pages.
Office Action for Canadian Application No. 3,057,903, dated Aug. 30, 2021, 4 pages.
Office Action for Canadian Application No. 3,057,905, dated Jan. 20, 2021, 6 pages.
Office Action for Chinese Application No. 2018800231958, dated Apr. 21, 2021, 17 pages.
Office Action for Chinese Application No. 2018800231958, dated Dec. 17, 2021, 10 pages.
Office Action for Chinese Application No. 201880023195.8, dated Jun. 21, 2022, 4 pages.
Office Action for Japanese Application No. 2019-551462 dated Dec. 15, 2020, 4 pages.
Office Action for Japanese application No. 2019-551471, dated Apr. 20, 2021, 2 pages.
Office Action for Japanese Application No. 2019-551471 dated Dec. 15, 2020, 8 pages.
Office Action for Japanese Application No. 2020-121066, dated Jun. 22, 2021, 6 pages.
Office action for Japanese Application No. 2021-074263, dated Jun. 14, 2022, 14 pages.
Office action for Japanese Application No. 2021-074266, dated Jul. 26, 2022, 8 pages.
Office Action for Korean Application No. 10-2019-7032076, dated May 25, 2021, 4 pages.
Office action for Korean Application No. 10-2019-7038229, dated Jul. 19, 2022, 15 pages.
Office Action for Korean Application No. 10-2020-7017740, dated Feb. 8, 2022, 14 pages.

* cited by examiner

ARTICLE FOR USE WITH APPARATUS FOR HEATING SMOKABLE MATERIAL

PRIORITY CLAIM

The present application is a National Phase entry of PCT Application No. PCT/EP2016/070178, filed Aug. 26, 2016, which claims priority from U.S. patent application Ser. No. 14/840,703, filed Aug. 31, 2015, each of which is hereby fully incorporated herein by reference.

TECHNICAL FIELD

The present disclosure relates to articles for use with apparatus for heating smokable material to volatilize at least one component of the smokable material, to methods of manufacturing such articles, and to systems comprising such articles and apparatuses.

BACKGROUND

Smoking articles such as cigarettes, cigars and the like burn tobacco during use to create tobacco smoke. Attempts have been made to provide alternatives to these articles by creating products that release compounds without combusting. Examples of such products are so-called "heat not burn" products or tobacco heating devices or products, which release compounds by heating, but not burning, material. The material may be, for example, tobacco or other non-tobacco products, which may or may not contain nicotine.

SUMMARY

A first aspect of the present disclosure provides an article for use with apparatus for heating smokable material to volatilize at least one component of the smokable material, the article comprising: smokable material; and a cover around the smokable material; wherein the cover defines an outer surface of the article and comprises heater or heating material that is heatable by penetration with a varying magnetic field.

In an exemplary embodiment, the heating material is in contact with the smokable material.

In an exemplary embodiment, the cover comprises a closed circuit of the heating material.

In an exemplary embodiment, the closed circuit encircles the smokable material.

In an exemplary embodiment, the cover comprises a wrapper comprising heating material that is heatable by penetration with a varying magnetic field, and an adhesive adhering free ends of the wrapper to each other, and the adhesive comprises heating material that is heatable by penetration with a varying magnetic field.

In an exemplary embodiment, the cover comprises a first wrapper that encircles the smokable material and comprises heating material that is heatable by penetration with a varying magnetic field, a second wrapper that encircles the first wrapper, and an adhesive adhering free ends of the second wrapper to each other. In an exemplary embodiment, the first wrapper consists entirely, or substantially entirely, of the heating material. In an exemplary embodiment, the first wrapper comprises a closed circuit of the heating material that encircles the smokable material. In an exemplary embodiment, the second wrapper may be of a non-electrically-conductive material. In an exemplary embodiment, the second wrapper may be free of heating material.

In an exemplary embodiment, the cover comprises a sheet of material and the heating material on the sheet of material. In an exemplary embodiment, a major surface of the sheet of material is only partially covered by the heating material.

In an exemplary embodiment, the cover comprises a sheet of material and a plurality of discrete portions of the heating material in or on the sheet of material. In an exemplary embodiment, the discrete portions are parallel strips. The strips may be linear or non-linear.

In an exemplary embodiment, the cover comprises a wrapper comprising heating material that is heatable by penetration with a varying magnetic field, and at least one connector comprising heating material that is heatable by penetration with a varying magnetic field, wherein the connector is connected to the wrapper, wherein the closed circuit comprises the heating material of the wrapper and the heating material of the at least one connector. In an exemplary embodiment, the article is elongate and cylindrical, the wrapper forms a circumferential outer surface of the article, and the, or each, connector is located at a longitudinal end of the article.

In an exemplary embodiment, the heating material comprises electrically-conductive wire.

In an exemplary embodiment, the cover comprises a plurality of closed circuits of heating material that is heatable by penetration with a varying magnetic field. In an exemplary embodiment, the article is elongate and the closed circuits are spaced-apart in a longitudinal direction of the article.

In an exemplary embodiment, the heating material comprises a plurality of relatively closely-spaced portions of the heating material, and a plurality of less-closely-spaced portions of the heating material.

In an exemplary embodiment, a first part of the closed circuit comprises a plurality of relatively closely-spaced portions of the closed circuit, and a second part of the closed circuit comprises a plurality of less-closely-spaced portions of the closed circuit.

In an exemplary embodiment, the heating material comprises one or more materials selected from the group consisting of: an electrically-conductive material, a magnetic material, and a non-magnetic material.

In an exemplary embodiment, the heating material comprises a metal or a metal alloy.

In an exemplary embodiment, the heating material comprises one or more materials selected from the group consisting of: aluminum, gold, iron, nickel, cobalt, conductive carbon, graphite, plain-carbon steel, stainless steel, ferritic stainless steel, copper, and bronze.

In an exemplary embodiment, the smokable material comprises tobacco and/or one or more humectants.

In an exemplary embodiment, the cover comprises a wrapper or a sheet of paper.

In an exemplary embodiment, the article comprises a mouthpiece defining a passageway that is in fluid communication with the smokable material.

In an exemplary embodiment, the article is elongate and cylindrical.

In an exemplary embodiment, the article comprises an annular mass of the smokable material, and the article comprises a liner comprising a closed circuit of electrically-conductive material, wherein the annular mass of the smokable material is located around the liner so that the liner defines an inner surface of the article.

In respective exemplary embodiments, the liner may have any of the above-described features of the cover. In respective exemplary embodiments, the heating material of the liner may have any of the above-described features of the heating material of the cover.

In an exemplary embodiment, the article comprises a temperature detector for detecting a temperature of the article. In some embodiments, the article comprises one or more terminals connected to the temperature detector for making connection with a temperature monitor of the apparatus in use.

A second aspect of the present disclosure provides a method of manufacturing an article for use with apparatus for heating smokable material to volatilize at least one component of the smokable material, the method comprising: providing smokable material; and providing a cover around the smokable material so that the cover defines an outer surface of the article for contacting the apparatus, wherein the cover comprises heating material that is heatable by penetration with a varying magnetic field.

In an exemplary embodiment, the cover comprises a sheet of material, and the method comprises printing the heating material on at least one major surface of the sheet of material.

In an exemplary embodiment, the providing the cover comprises providing a wrapper comprising heating material that is heatable by penetration with a varying magnetic field around the smokable material, and adhering free ends of the wrapper together using an conductive adhesive that comprises heating material that is heatable by penetration with a varying magnetic field.

In an exemplary embodiment, the providing the cover comprises: providing a wrapper comprising heating material that is heatable by penetration with a varying magnetic field around the smokable material so that the wrapper defines the outer surface of the article; and connecting at least one connector comprising heating material that is heatable by penetration with a varying magnetic field to the wrapper so as to create a closed circuit of heating material, the closed circuit comprising the heating material of the wrapper and the heating material of the at least one connector.

A third aspect of the present disclosure provides a system, comprising: apparatus for heating smokable material to volatilize at least one component of the smokable material; and an article for use with the apparatus, wherein the article comprises smokable material and a cover around the smokable material, wherein the cover defines an outer surface of the article and comprises heating material that is heatable by penetration with a varying magnetic field.

In an exemplary embodiment, the cover comprises a closed circuit of the heating material.

In an exemplary embodiment, the apparatus comprises an interface for cooperating with the article, and a magnetic field generator for generating a varying magnetic field for penetrating the heating material when the article is cooperating with the interface.

In respective exemplary embodiments, the article of the system may have any of the features of the above-described exemplary embodiments of the article of the first aspect of the present disclosure.

BRIEF DESCRIPTION OF THE DRAWINGS

Embodiments of the disclosure will now be described, by way of example only, with reference to the accompanying drawings, in which.

DETAILED DESCRIPTION

Figure 1:
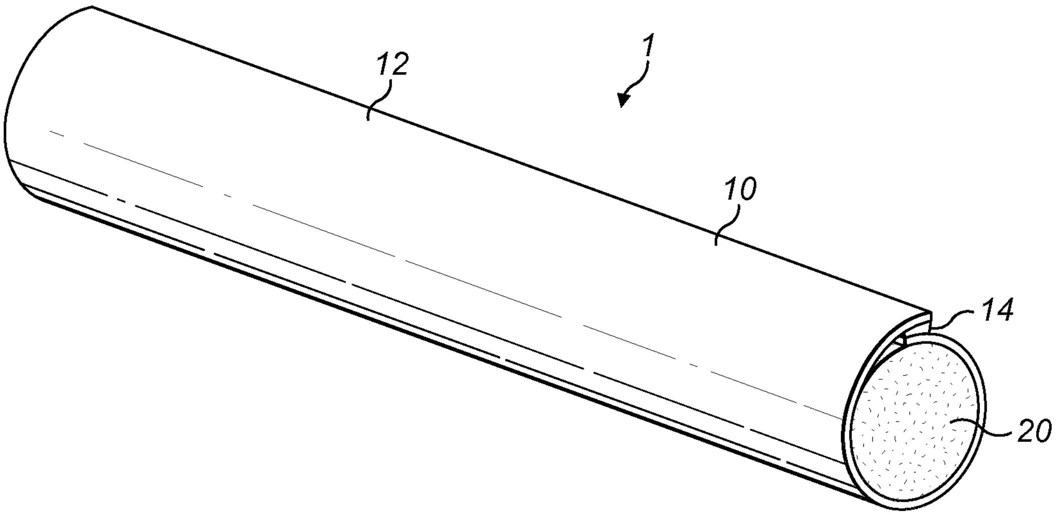
FIG. 1 shows a schematic perspective view of an example of an article for use with apparatus for heating smokable material to volatilize at least one component of the smokable material.

As used herein, the term "smokable material" includes materials that provide volatilized components upon heating, typically in the form of vapor or an aerosol. "Smokable material" may be a non-tobacco-containing material or a tobacco-containing material. "Smokable material" may, for example, include one or more of tobacco per se, tobacco derivatives, expanded tobacco, reconstituted tobacco, tobacco extract, homogenized tobacco or tobacco substitutes. The smokable material can be in the form of ground tobacco, cut rag tobacco, extruded tobacco, liquid, gel, gelled sheet, powder, or agglomerates. "Smokable material" also may include other, non-tobacco, products, which, depending on the product, may or may not contain nicotine. "Smokable material" may comprise one or more humectants, such as glycerol or propylene glycol.

As used herein, the term "heating material" refers to material that is heatable by penetration with a varying magnetic field.

As used herein, the terms "flavor" and "flavorant" refer to materials which, where local regulations permit, may be used to create a desired taste or aroma in a product for adult consumers. They may include extracts (e.g., licorice, hydrangea, Japanese white bark magnolia leaf, chamomile, fenugreek, clove, menthol, Japanese mint, aniseed, cinnamon, herb, wintergreen, cherry, berry, peach, apple, Drambuie, bourbon, scotch, whiskey, spearmint, peppermint, lavender, cardamom, celery, cascarilla, nutmeg, sandalwood, bergamot, geranium, honey essence, rose oil, vanilla, lemon oil, orange oil, cassia, caraway, cognac, jasmine, ylang-ylang, sage, fennel, piment, ginger, anise, coriander, coffee, or a mint oil from any species of the genus Mentha), flavor enhancers, bitterness receptor site blockers, sensorial receptor site activators or stimulators, sugars and/or sugar substitutes (e.g., sucralose, acesulfame potassium, aspartame, saccharine, cyclamates, lactose, sucrose, glucose, fructose, sorbitol, or mannitol), and other additives such as charcoal, chlorophyll, minerals, botanicals, or breath freshening agents. They may be imitation, synthetic or natural ingredients or blends thereof. They may be in any suitable form, for example, oil, liquid, gel, powder, or the like.

Induction heating is a process in which an electrically-conductive object is heated by penetrating the object with a varying magnetic field. The process is described by Faraday's law of induction and Ohm's law. An induction heater may comprise an electromagnet and a device for passing a varying electrical current, such as an alternating current, through the electromagnet. When the electromagnet and the object to be heated are suitably relatively positioned so that the resultant varying magnetic field produced by the electromagnet penetrates the object, one or more eddy currents are generated inside the object. The object has a resistance to the flow of electrical currents. Therefore, when such eddy currents are generated in the object, their flow against the electrical resistance of the object causes the object to be heated. This process is called Joule, ohmic, or resistive heating. An object that is capable of being inductively heated is known as a susceptor.

It has been found that, when the susceptor is in the form of a closed circuit, magnetic coupling between the susceptor and the electromagnet in use is enhanced, which results in greater or improved Joule heating.

Magnetic hysteresis heating is a process in which an object made of a magnetic material is heated by penetrating the object with a varying magnetic field. A magnetic material can be considered to comprise many atomic-scale magnets, or magnetic dipoles. When a magnetic field penetrates such material, the magnetic dipoles align with the magnetic field. Therefore, when a varying magnetic field, such as an alternating magnetic field, for example as produced by an electromagnet, penetrates the magnetic material, the orientation of the magnetic dipoles changes with the varying applied magnetic field. Such magnetic dipole reorientation causes heat to be generated in the magnetic material.

When an object is both electrically-conductive and magnetic, penetrating the object with a varying magnetic field can cause both Joule heating and magnetic hysteresis heating in the object. Moreover, the use of magnetic material can strengthen the magnetic field, which can intensify the Joule heating.

In each of the above processes, as heat is generated inside the object itself, rather than by an external heat source by heat conduction, a rapid temperature rise in the object and more uniform heat distribution can be achieved, particularly through selection of suitable object material and geometry, and suitable varying magnetic field magnitude and orientation relative to the object. Moreover, as induction heating and magnetic hysteresis heating do not require a physical connection to be provided between the source of the varying magnetic field and the object, material deposits on the object such as smokable material residue may be less of an issue, design freedom and control over the heating profile may be greater, and cost may be lower.

Figure 2:
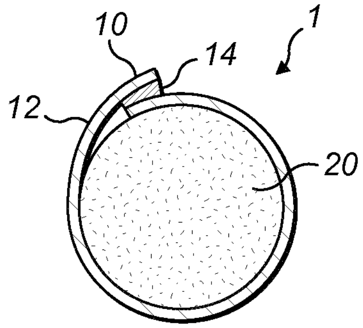
FIG. 2 shows a schematic cross-sectional view of the article of FIG. 1.

Referring to FIGS. 1 and 2 there are shown a schematic perspective view and a schematic cross-sectional view of an example of an article according to an embodiment of the invention. The article 1 comprises smokable material 20 and a cover 10 around the smokable material 20. The article 1 is for use with apparatus for heating the smokable material 20 to volatilize at least one component of the smokable material 20 without burning the smokable material 20. An example such apparatus is described below. The cover 10 defines an outer surface of the article 1, which may contact the apparatus in use. Moreover, the cover 10 comprises heating material that is heatable by penetration with a varying magnetic field, as will be described in more detail below. The heating material may be heatable in use to heat the smokable material 20. In this embodiment, the cover 10 comprises a closed circuit of the heating material.

In this embodiment, the article 1 is elongate and cylindrical with a substantially circular cross section. However, in other embodiments, the article may have a cross section other than circular and/or not be elongate and/or not be cylindrical. In this embodiment, the article 1 has proportions approximating those of a cigarette.

In this embodiment, the cover 10 comprises a wrapper 12 comprising the heating material. The wrapper 12 may consist entirely, or substantially entirely, of the heating material. In this embodiment, the wrapper 12 consists of a sheet of foil of the heating material. In this embodiment, the wrapper 12 is wrapped around the smokable material 20 so that free ends of the wrapper 12 overlap each other. The wrapper 12 thus forms all of, or a majority of, a circumferential outer surface of the article 1. The free ends of the wrapper 12 may contact each other, so that the wrapper 12 itself forms the closed circuit of heating material that encircles the smokable material 20.

The cover 10 of this embodiment also comprises an adhesive 14 that adheres the overlapped free ends of the wrapper 12 to each other. The adhesive of this embodiment comprises heating material that is heatable by penetration with a varying magnetic field. The adhesive may comprise one or more of, for example, gum Arabic, natural or synthetic resins, starches, and varnish. The adhesive may comprise one or more powders or fibers of, for example, copper, silver and graphite. The adhesive helps prevent the overlapped free ends of the wrapper 12 from separating, and creates a more robust and reliable closed circuit of heating material that encircles the smokable material 20. In this embodiment, the closed circuit comprises the heating material of the sheet of foil 12 and the heating material of the adhesive 14. In other embodiments, the adhesive 14 may be omitted, or the closed circuit may not comprise the adhesive 14. In such other embodiments, the closed circuit may be formed only by the wrapper 12 itself. The combination of the wrapper 12 and the adhesive 14 may define an outer surface of the article 1, which may contact the apparatus in use. It is to be noted that the size of the adhesive 14 relative to the wrapper 12 is accentuated in FIGS. 1 and 2 for clarity.

The sheet of foil 12 of this embodiment comprises aluminum. When exposed to air, an aluminum surface oxidizes over time. As a result, were either or both of the contacting surfaces of the overlapped free ends of the wrapper 12 to comprise a layer of aluminum oxide, then the closed circuit of heating material around the smokable material 20 could become incomplete or open. In this embodiment, before much, if any, aluminum oxide formed on the surfaces of the overlapped free ends of the sheet of foil 12, the free ends of the sheet of foil 12 were adhered to each other by the electrically-conductive adhesive 14. As noted above, this creates a more robust and reliable closed circuit of heating material.

In other embodiments, the heating material of the wrapper 12 may comprise one or more materials selected from the group consisting of: an electrically-conductive material, a magnetic material, and a non-magnetic material. In some embodiments, the heating material may comprise a metal or a metal alloy. In some embodiments, the heating material may comprise one or more materials selected from the group consisting of: aluminum, gold, iron, nickel, cobalt, conductive carbon, graphite, plain-carbon steel, stainless steel, ferritic stainless steel, copper, and bronze. Other heating material(s) may be used in other embodiments. It has also been found that, when magnetic electrically-conductive material is used as the heating material, magnetic coupling between the magnetic electrically-conductive material and an electromagnet of the apparatus in use may be enhanced. In addition to potentially enabling magnetic hysteresis heating, this can result in greater or improved Joule heating of the heating material, and thus greater or improved heating of the smokable material 20.

In this embodiment, the heating material is in contact with the smokable material 20. Thus, when the heating material of the closed circuit is heated by penetration with a varying magnetic field, heat may be transferred directly from the heating material of the closed circuit to the smokable material 20. In some embodiments, the wrapper 12 may comprise a sheet of material, such as paper, and a layer of heating material on a major surface of the sheet of material. In some such embodiments, the layer of heating material may be in contact with the smokable material 20, so that again heat may be transferred directly from the heating material of the closed circuit to the smokable material 20.

In some embodiments, the cover 10 may comprise a mass of thermal insulation radially outwards of the wrapper 12. The thermal insulation may comprise one or more materials selected from the group consisting of: aerogel, vacuum insulation, wadding, fleece, non-woven material, non-woven fleece, woven material, knitted material, nylon, foam, polystyrene, polyester, polyester filament, polypropylene, a blend of polyester and polypropylene, cellulose acetate, paper or card, and corrugated material such as corrugated paper or card. The thermal insulation may additionally or alternatively comprise an air gap. Such thermal insulation can help prevent heat loss to components of the apparatus, and provide more efficient heating of the smokable material within the cover 10. In some embodiments, the insulation may have a thickness of up to one millimeter, such as up to 0.5 millimeter.

The heating material may have a skin depth, which is an exterior zone within which most of an induced electrical current and/or induced reorientation of magnetic dipoles occurs. By providing that the heating material has a relatively small thickness, a greater proportion of the heating material may be heatable by a given varying magnetic field, as compared to heating material having a depth or thickness that is relatively large as compared to the other dimensions of the heating material. Thus, a more efficient use of material is achieved. In turn, costs are reduced.

In some embodiments, which are respective variations to the embodiment of FIGS. 1 and 2, the cover 10 may comprise first and second wrappers. The first wrapper encircles the smokable material and comprises heating material that is heatable by penetration with a varying magnetic field. The second wrapper encircles the first wrapper. The cover may further comprise an adhesive that adheres free ends of the second wrapper to each other. Such adhering may have the effect of holding both the wrappers in position relative to the smokable material. A benefit of some such embodiments is that the adhesive that adheres the free ends of the second wrapper to each other need not comprise heating material. The adhesive may comprise one or more of, for example, gum Arabic, natural or synthetic resins, starches, and varnish.

The first wrapper may, for example, be the same as the wrapper 12 of the embodiment of FIGS. 1 and 2, or any of the above-described variations to the wrapper 12 of that embodiment. In some embodiments, the first wrapper consists entirely, or substantially entirely, of the heating material. In some embodiments, the first wrapper may comprise a closed circuit of the heating material that encircles the smokable material. The first wrapper may comprise electrically-conductive material, such as a layer of electrically-conductive material that encircles the smokable material. The heating material of the first wrapper may comprise any one or more of the materials discussed above for the heating material of the wrapper 12.

The second wrapper may be of a non-electrically-conductive material. The second wrapper may be free of heating material. The second wrapper may, for example, be made of paper.

Figure 3:
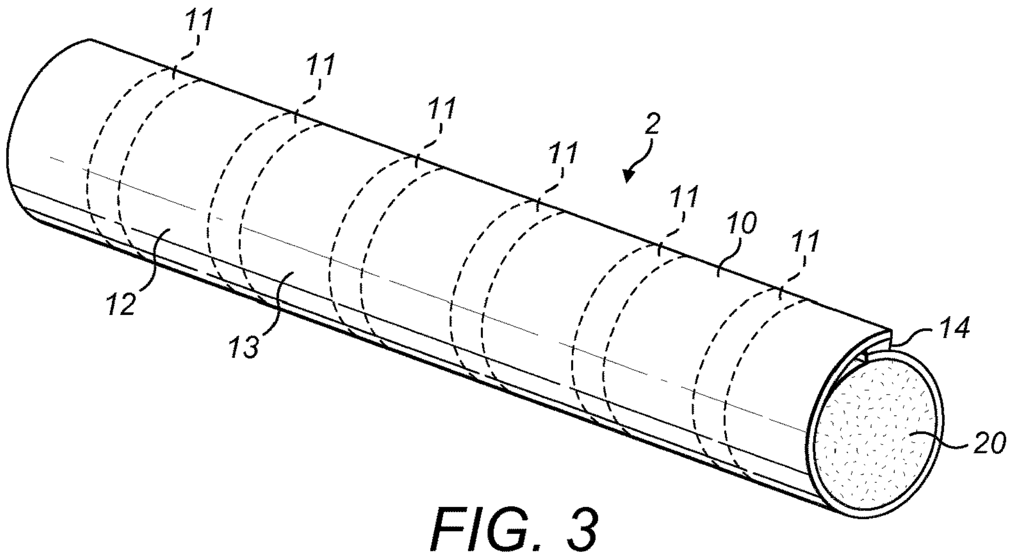
FIG. 3 shows a schematic perspective view of an example of another article for use with apparatus for heating smokable material to volatilize at least one component of the smokable material.

Referring to FIG. 3 there is shown a schematic perspective view of an example of another article according to an embodiment of the disclosure. The article 2 of this embodiment is identical to the article 1 of FIGS. 1 and 2 except for the form of the cover 10. Any of the above-described possible variations to the article 1 of FIGS. 1 and 2 may be made to the article 2 of FIG. 3 to form separate respective embodiments.

In this embodiment, the cover 10 comprises a wrapper 12 comprising heating material. More specifically, the wrapper 12 comprises a sheet of material 13 and wires or tracks 11 of heating material on a major surface of the sheet of material 13. Therefore, the major surface of the sheet of material 13 is only partially covered by the heating material. In this embodiment, the wires or tracks 11 are between the sheet of material 13 and the smokable material 20. In this embodiment, the sheet of material 13 comprises a sheet of paper, but in other embodiments the sheet of material 13 may be made of an electrically-insulating material other than paper. In this embodiment, the wrapper 12 is wrapped around the smokable material 20 so that free ends of the wrapper 12 overlap each other. The wrapper 12 thus forms all of, or a majority of, a circumferential outer surface of the article 2.

The cover 10 of this embodiment also comprises an adhesive 14 that adheres the overlapped free ends of the wrapper 12 to each other. The adhesive of this embodiment comprises heating material. The adhesive may be the same as any one of the adhesives discussed above. The adhesive helps prevent the overlapped free ends of the wrapper 12 from separating. The adhesive 14 also connects respective free ends of each of the wires or tracks 11, so as to create a plurality of closed circuits of heatable material that each encircle the smokable material 20. To achieve this, the adhesive may extend around at least one of the free ends of the wrapper 12, or may extend through one or more through holes, or vias, in the wrapper 12. The closed circuits of heating material may be heatable in use to heat the smokable material 20. The combination of the wrapper 12 and the adhesive 14 may define an outer surface of the article 1, which may contact the apparatus in use. It is to be noted that the size of the adhesive 14 relative to the wrapper 12 is accentuated in FIG. 3 for clarity.

In this embodiment, the closed circuits are spaced-apart in a longitudinal direction of the article 2. In this embodiment, each of the closed circuits comprises the heating material of one of the wires or tracks 11 and the heating material of the adhesive 14. In other embodiments, the adhesive 14 may be omitted, or the closed circuits may not comprise the electrically-conductive adhesive 14. In such other embodiments, the closed circuits may be formed only by the wires or tracks 11.

The wires or tracks 11 of this embodiment comprise aluminum. In other embodiments, the electrically-conductive material of the wires or tracks 11 may comprise any one or more of the materials discussed above for the heating material of earlier embodiments.

In this embodiment, the wires or tracks 11 are in contact with the smokable material 20. Thus, when the electrically-conductive material of the closed circuits is heated by induction heating, heat may be transferred directly from the electrically-conductive material of the closed circuits to the smokable material 20. However, in other embodiments, the wires or tracks 11 may be kept out of contact with the smokable material 20. For example, the sheet of material 13 may be located between the wires or tracks 11 and the smokable material 20. In some embodiments, the wires or tracks 11 may be embedded within the sheet of material 13.

In this embodiment, the wires or tracks 11 are of substantially equal axial width. In other embodiments, the tracks 11 may be of different respective widths. Regions of the smokable material 20 adjacent the wider tracks may then be heated to a greater degree by the application of a given varying magnetic field than regions of the smokable material 20 adjacent the narrower tracks.

Figure 4:
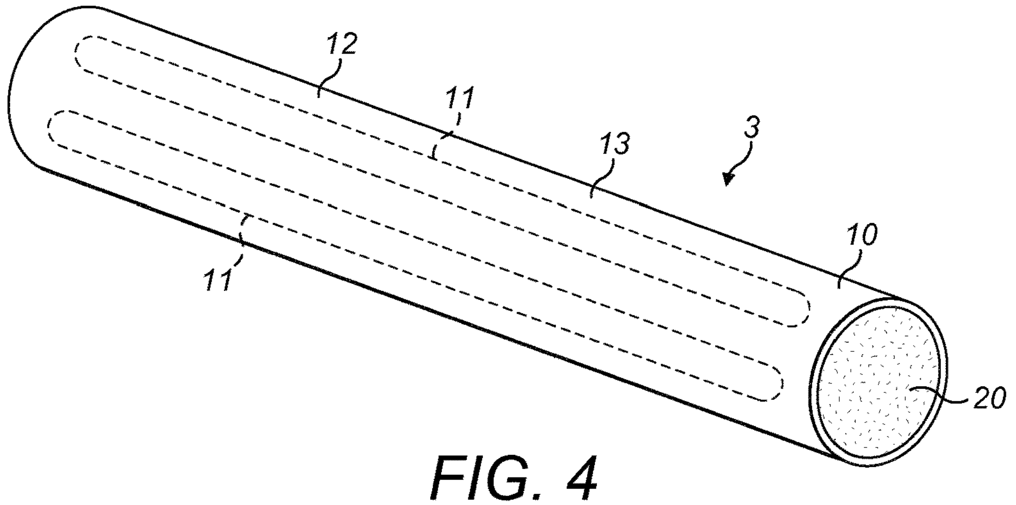
FIG. 4 shows a schematic perspective view of an example of another article for use with apparatus for heating smokable material to volatilize at least one component of the smokable material.

Referring to FIG. 4 there is shown a schematic perspective view of an example of another article according to an embodiment of the disclosure. The article 3 of this embodiment is identical to the article 1 of FIGS. 1 and 2 except for the form of the cover 10. Any of the above-described possible variations to the article 1 of FIGS. 1 and 2 may be made to the article 3 of FIG. 4 to form separate respective embodiments.

In this embodiment, the cover 10 comprises a wrapper 12 comprising heating material. More specifically, the wrapper 12 comprises a sheet of material 13 and wires or tracks 11 of heating material on a major surface of the sheet of material 13. Therefore, the major surface of the sheet of material 13 is only partially covered by the heating material. In this embodiment, the wires or tracks 11 are between the sheet of material 13 and the smokable material 20. In this embodiment, the sheet of material 13 comprises a sheet of paper, but in other embodiments the sheet of material 13 may be made of an electrically-insulating material other than paper. In this embodiment, the wrapper 12 is wrapped around the smokable material 20 so that free ends of the wrapper 12 overlap each other. The wrapper 12 thus forms all of, or a majority of, a circumferential outer surface of the article 3.

The cover 10 of this embodiment may also comprise an adhesive (not shown) that adheres the overlapped free ends of the wrapper 12 to each other to help prevent them from separating. In other embodiments, the adhesive may be omitted. When such adhesive is present, the combination of the wrapper 12 and the adhesive may define an outer surface of the article 1, which may contact the apparatus in use.

In this embodiment, the wires or tracks 11 define a plurality of closed circuits of the heating material. That is, the wrapper 12 comprises a plurality of closed circuits of the heating material, each of which closed circuits is formed by one of the wires or tracks 11. The closed circuits of heating material may be heatable in use to heat the smokable material 20. In this embodiment, the closed circuits are elongate in a direction parallel to the longitudinal dimension of the article 3, and are spaced-apart in a circumferential direction of the article 3. In other embodiments, the wires or tracks 11, and thus the closed circuits, may be arranged differently relative to each other or to the sheet of material 13.

The wires or tracks 11 of this embodiment comprise aluminum. In other embodiments, the heating material of the wires or tracks 11 may comprise any one or more of the materials discussed above for the heating material of earlier embodiments.

In this embodiment, the wires or tracks 11 are in contact with the smokable material 20. Thus, when the heating material of the closed circuits is heated by penetration with a varying magnetic field, heat may be transferred directly from the heating material of the closed circuits to the smokable material 20. However, in other embodiments, the wires or tracks 11 may be kept out of contact with the smokable material 20, as discussed above.

Figure 5:
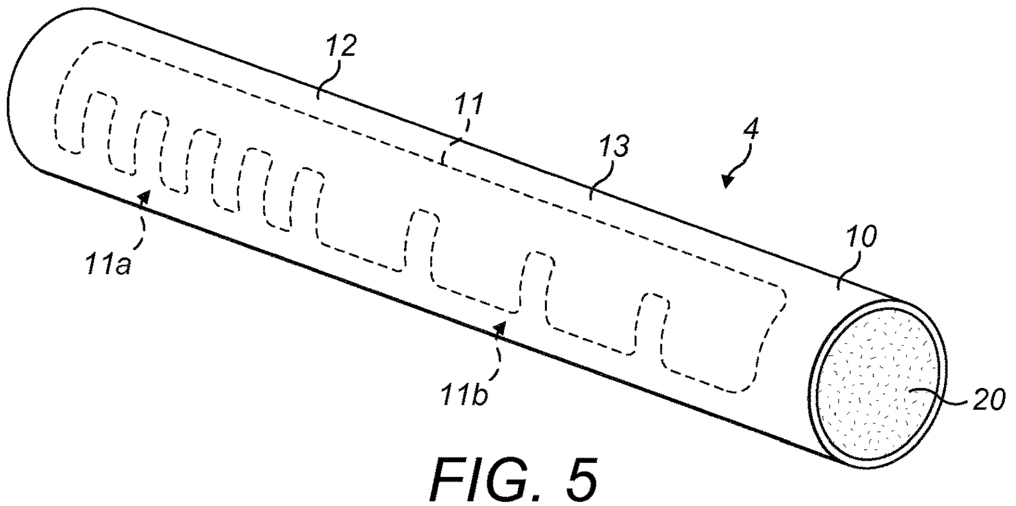
FIG. 5 shows a schematic perspective view of an example of another article for use with apparatus for heating smokable material to volatilize at least one component of the smokable material.

Referring to FIG. 5 there is shown a schematic perspective view of an example of another article according to an embodiment of the invention. The article 4 of this embodiment is identical to the article 3 of FIG. 4 except for the form of the cover 10. Any of the above-described possible variations to the article 3 of FIG. 4 may be made to the article 4 of FIG. 5 to form separate respective embodiments.

In this embodiment, the cover 10 comprises a wrapper 12 comprising a sheet of material 13 and a wire or track 11 of heating material on a major surface of the sheet of material 13. Therefore, the major surface of the sheet of material 13 is only partially covered by the heating material. In this embodiment, the wire or track 11 is between the sheet of material 13 and the smokable material 20. In this embodiment, the wrapper comprises only a single wire or track 11 of heating material on the sheet of material 13. However, in other embodiments, the wrapper 12 may comprise a plurality of wires or tracks 11 of heating material on the sheet of material 13.

In this embodiment, the wire or track 11 defines a closed circuit of the heating material. The closed circuit of heating material may be heatable in use to heat the smokable material 20. In this embodiment, overall, the closed circuit is elongate in a direction parallel to the longitudinal dimension of the article 3. However, the wire or track 11 follows a tortuous path on the sheet of material 13. More particularly, in this embodiment, a first part 11*a* of the closed circuit comprises a plurality of relatively closely-spaced portions of the closed circuit, and a second part 11*b* of the closed circuit comprises a plurality of less-closely-spaced portions of the circuit. Thus, the heating material comprises a plurality of relatively closely-spaced portions, and a plurality of less-closely-spaced portions. Accordingly, when heated by penetration with a varying magnetic field, the wire or track 11 emits more heat per unit area at the first part 11*a* of the closed circuit than at the second part 11*b* of the closed circuit. Thus, progressive heating of the smokable material 20, and thereby progressive generation of vapor, is achievable.

More specifically, the first part 11*a* of the closed circuit is able to heat a first region of the smokable material 20 relatively quickly to initialize volatilization of at least one component of the smokable material 20 and formation of vapor in the first region of the smokable material 20. The second part 11*b* of the closed circuit is able to heat a second region of the smokable material 20 relatively slowly to initialize volatilization of at least one component of the smokable material 20 and formation of vapor in the second region of the smokable material 20. Accordingly, vapor is able to be formed relatively rapidly for inhalation by a user, and vapor can continue to be formed thereafter for subsequent inhalation by the user even after the first region of the smokable material 20 may have ceased generating vapor. The first region of the smokable material 20 may cease generating the vapor when it becomes exhausted of volatilizable components of the smokable material 20.

The wire or track 11 of this embodiment comprises aluminum. In other embodiments, the electrically-conductive material of the wire or track 11 may comprise any one or more of the materials discussed above for the heating material of earlier embodiments.

In this embodiment, the wire or track 11 are in contact with the smokable material 20. Thus, when the heating material of the closed circuit is heated by penetration with a varying magnetic field, heat may be transferred directly from the heating material of the closed circuit to the smokable material 20. However, in other embodiments, the wire or track 11 may be kept out of contact with the smokable material 20, as discussed above.

Figure 6:
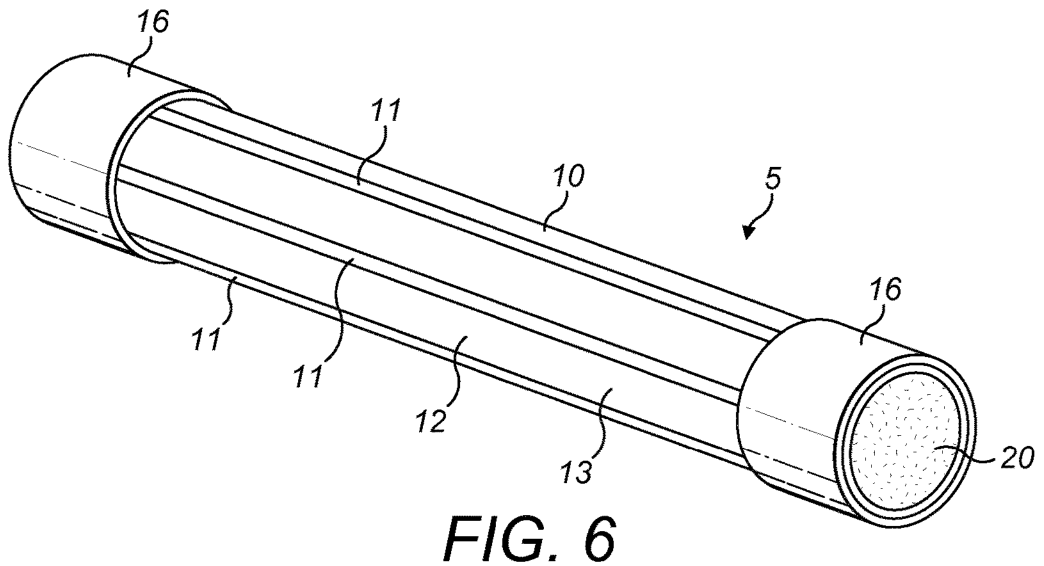
FIG. 6 shows a schematic perspective view of an example of another article for use with apparatus for heating smokable material to volatilize at least one component of the smokable material
Figure 7:
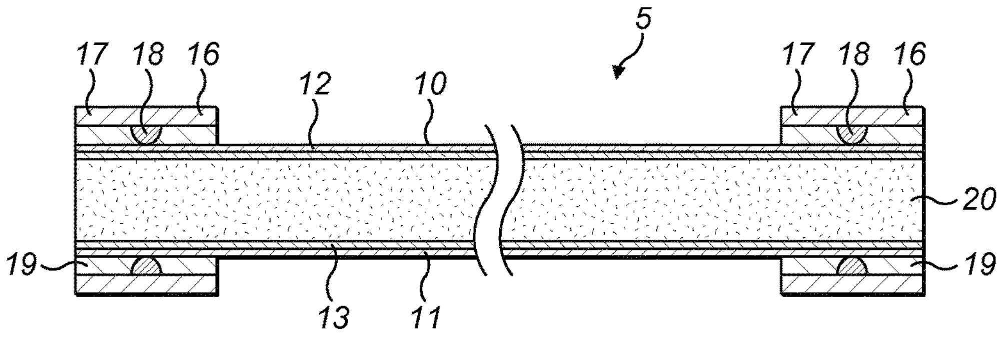
FIG. 7 shows a schematic cross-sectional view of the article of FIG. 6.

Referring to FIGS. 6 and 7 there are shown a schematic perspective view and a schematic cross-sectional view of an example of another article according to an embodiment of the invention. The article 5 comprises smokable material 20 and a cover 10 around the smokable material 20. The article 5 is for use with apparatus for heating the smokable material 20 to volatilize at least one component of the smokable material 20 without burning the smokable material 20. The cover 10 defines an outer surface of the article 5, which may contact the apparatus in use. Moreover, the cover 10 comprises a plurality of closed circuits of heating material, as will be described in more detail below.

In this embodiment, the article 5 is elongate and cylindrical with a substantially circular cross section. However, in other embodiments, the article may have a cross section other than circular and/or not be elongate and/or not be cylindrical. In this embodiment, the article 5 has proportions approximating those of a cigarette.

In this embodiment, the cover 10 comprises a wrapper 12 comprising heating material. More specifically, the wrapper 12 comprises a sheet of material 13 and discrete wires or tracks 11 of heating material on a major surface of the sheet of material 13. Therefore, the major surface of the sheet of material 13 is only partially covered by the heating material. In this embodiment, the sheet of material 13 is between the wires or tracks 11 and the smokable material 20. In this embodiment, each of the wires or tracks 11 is linear and parallel to the longitudinal dimension of the article 5, and the wires or tracks 11 are spaced-apart in a circumferential direction of the article 5. However, in other embodiments, the wires or tracks 11 may be non-linear and/or non-parallel to the longitudinal dimension of the article 5.

In this embodiment, the sheet of material 13 comprises a sheet of paper, but in other embodiments the sheet of material 13 may be made of an electrically-insulating material other than paper. In this embodiment, the wrapper 12 is wrapped around the smokable material 20 so that free ends of the wrapper 12 overlap each other. The wrapper 12 thus forms part of a circumferential outer surface of the article 5.

The cover 10 of this embodiment may also comprise an adhesive (not shown) that adheres the overlapped free ends of the wrapper 12 to each other to help prevent them from separating. In other embodiments, the adhesive may be omitted.

In this embodiment, the cover 10 also comprises two connectors 16, each of which is located at a longitudinal end of the article 5. However, in other embodiments, one or each of the connectors 16 may be located elsewhere along the length of the article 5. In this embodiment, each of the connectors 16 comprises a strip of material 17 and one or more bodies 18 of heating material on the strip of material 17. In this embodiment, the strip of material 17 is a strip of paper, but in other embodiments the strip of material 17 may be made of an electrically-insulating material other than paper. In this embodiment, the connectors 16 are adhered to the wrapper 12 by an adhesive 19, which may be an adhesive comprising heating material. In this embodiment, the combination of the wrapper 12 and the connectors 16 defines an outer surface of the article 5, which may contact the apparatus in use. It is to be noted that the size of the adhesive 19, connectors 16 and components thereof relative to the wrapper 12 is accentuated in FIG. 7 for clarity.

In this embodiment, the connectors 16 are arranged so that at least two of the wires or tracks 11 on the sheet of material 13 are connected by the bodies 18 of heating material of both the connectors 16, so as to form a plurality of closed circuits of heating material. In a variation to this embodiment, only two wires or tracks 11 may be provided on the sheet of material 13, and those two wires or tracks 11 may be connected by the bodies 18 of heating material of both the connectors 16, so as to form just one closed circuit of heating material. The, or each, closed circuit of heating material may be heatable in use to heat the smokable material 20.

The wires or tracks 11 of this embodiment comprise aluminum. In other embodiments, the electrically-conductive material of the wires or tracks 11 may comprise any one or more of the materials discussed above for the heating material of earlier embodiments.

In this embodiment, the wires or tracks 11 are in contact with the smokable material 20. Thus, when the heating material of the closed circuits is heated by penetration with a varying magnetic field, heat may be transferred directly from the heating material of the closed circuits to the smokable material 20. However, in other embodiments, the wires or tracks 11 may be kept out of contact with the smokable material 20. For example, the sheet of material 13 may be located between the wires or tracks 11 and the smokable material 20. In some embodiments, the wires or tracks 11 may be embedded within the sheet of material 13.

In a variation to the illustrated embodiment, the wires or tracks 11 may each be U-shaped, with the free ends of the arms of the U located at one longitudinal end of the article 5. In such a variation, only one of the connectors 16 need be provided at that one longitudinal end of the article 5 to create one or more closed circuits comprising the heating material of the wires or tracks 11 and the body 18 of the connector 16.

In a variation to the illustrated embodiment, the connector(s) 16 may take a different form to that shown in FIGS. 6 and 7. For example, in some embodiments, the, or each, connector may abut a longitudinal end of the combination of the smokable material 20 and wrapper 12, so as to form a longitudinal end of the article 5. In such a variation, the, or each, connector 16 may comprise heating material that abuts the associated longitudinal end of the combination of the smokable material 20 and wrapper 12 and connects at least two of the wires or tracks 11 on the sheet 13.

In some embodiments, the connector(s) may be movable or rotatable relative to the wires or tracks 11 on the sheet 13. Such rotation may enable the number of connections between the wires or tracks 11 made by the connector(s) to be changed, thereby to vary the amount of heating material present in a circuit or circuits, which may vary the intensity of heating provided to the smokable material 20. In some embodiments, the tracks 11 may be of different thicknesses and/or widths, so that different heating profiles may be created by rotating the connector(s) to different rotational positions relative to the tracks 11.

In respective variations to this embodiment, the connector(s) may be omitted. In such embodiments, the article may comprise the smokable material 20 and the cover 10 around the smokable material 20, wherein the cover 10 defines an outer surface of the article. The cover may comprise a sheet of material and a plurality of discrete portions of heating material that is heatable by penetration with a varying magnetic field. The discrete portions may be in or on the sheet of material. The discrete portions may be between the sheet and the smokable material, or the sheet may be between the discrete portions and the smokable material.

The discrete portions may be parallel strips or other than parallel strips, such as discrete patches of the heating material. Such parallel strips may be linear or non-linear. The discrete nature of the discrete portions provides thermal breaks between the discrete portions, to control the degree to which different regions of the smokable material 20 are heated in use. This may help progressive heating of the smokable material 20, and thus progressive generation of vapor, to be achieved. The heating material may comprise a plurality of relatively closely-spaced discrete portions, and a plurality of less-closely-spaced discrete portions. Accordingly, when heated by penetration with a varying magnetic field, the closely-spaced discrete portions emit more heat per unit area than the less-closely-spaced discrete portions. Thus, progressive heating of the smokable material 20, and thereby progressive generation of vapor, is achievable.

In some embodiments, the article comprises an annular mass of the smokable material 20, and the article comprises a liner comprising a closed circuit of heating material, wherein the annular mass of the smokable material 20 is located around the liner so that the liner defines an inner surface of the article. The liner may have any of the above-described features of the cover. The heating material of the liner may have any of the above-described features of the heating material of the cover. The closed circuit of heating material of the liner may be heatable in use, to further or more effectively heat the smokable material 20 of the article.

In some embodiments, the heating material may not be susceptible to eddy currents being induced therein by penetration with a varying magnetic field. In such embodiments, the heating material may be a magnetic material that is non-electrically-conductive, and thus may be heatable by the magnetic hysteresis process discussed above.

Figure 8:
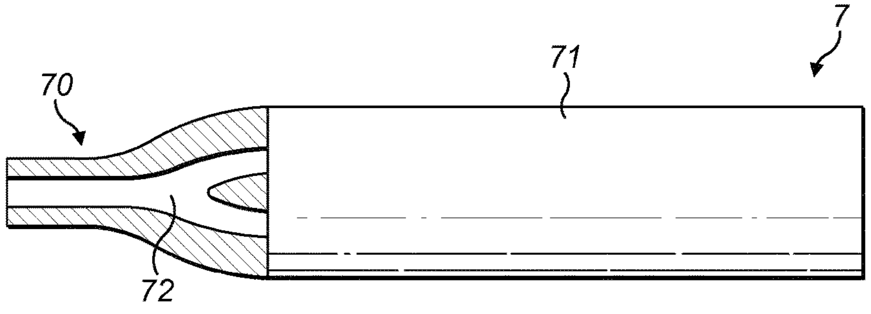
FIG. 8 shows a schematic partial cross-sectional view of an example of another article for use with apparatus for heating smokable material to volatilize at least one component of the smokable material.

In some embodiments, the article comprises a mouthpiece defining a passageway that is in fluid communication with the smokable material 10. Referring to FIG. 8, there is shown a schematic partial cross-sectional view of an example of an article 7 according to an embodiment of the disclosure. The section of the article 7 numbered 71 could comprise any of the constructions shown in FIGS. 1 to 7 or any of the variants thereof discussed above. The mouthpiece 70 and passageway 72 thereof are shown connected to the construction with the passageway 72 aligned so as to be in fluid communication with the smokable material 10 of the construction. The mouthpiece 70 may be made of any suitable material, such as a plastics material, cardboard, or rubber.

In use, when the smokable material 10 is heated by the heated heating material of the article, volatilized components of the smokable material 10 can be readily inhaled by a user. In embodiments in which the article is a consumable article, once all or substantially all of the volatilizable component(s) of the smokable material 10 in the article has/have been spent, the user may dispose of the mouthpiece together with the rest of the article. This can be more hygienic than using the same mouthpiece with multiple articles, can help ensure that the mouthpiece is correctly aligned with the smokable material, and presents a user with a clean, fresh mouthpiece each time they wish to use another article.

The mouthpiece 70, when provided, may comprise or be impregnated with a flavorant. The flavorant may be arranged so as to be picked up by heated vapor as the vapor passes through the passageway 72 of the mouthpiece 70 in use.

Figure 9:
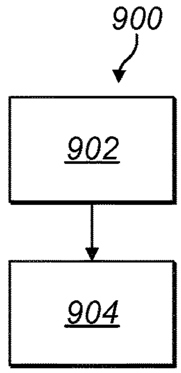
FIG. 9 is a flow diagram showing an example of a method of manufacturing an article for use with apparatus for heating smokable material to volatilize at least one component of the smokable material.

Referring to FIG. 9 there is shown a flow diagram of an example of a method according to an embodiment of the invention of manufacturing an article for use with apparatus for heating smokable material to volatilize at least one component of the smokable material. The method may be used to manufacture one of the above-described articles 1, 2, 3, 4, 5.

The method 900 comprises providing 902 the smokable material 20, and providing 904 the cover 10 around the smokable material 20 so that the cover 10 defines the outer surface of the article 1, 2, 3, 4, 5.

In some embodiments in which the cover 10 comprises a sheet of material 13, the method may comprise printing heating material on at least one major surface of the sheet of material 13. Such printing may be used to provide the wires or tracks 11 on the sheet of material 13 of the articles 2, 3, 4, 5 shown in FIGS. 3 to 7, for example.

In some embodiments, the providing 904 the cover 10 around the smokable material 20 may comprise providing a wrapper 12 comprising heating material around the smokable material 20, and may comprise adhering free ends of the wrapper 12 together using an adhesive 14 comprising heating material. Such a process may be used in the manufacture of the articles 1, 2 shown in FIGS. 1 to 3, for example. The process may be based on a known process for rolling cigarettes.

In some embodiments, the providing 904 the cover 10 may comprise providing a wrapper 12 comprising heating material around the smokable material 20 so that the wrapper 12 defines an outer surface of the article 5. The providing 904 the cover 10 may further comprise connecting at least one connector 16 comprising heating material 18 to the wrapper 12 so as to create a closed circuit of heating material, the closed circuit comprising the heating material of the wrapper 12 and the heating material of the at least one connector 16. Such a process may be used in the manufacture of the article 5 shown in FIGS. 6 and 7, for example.

Each of the above-described articles 1, 2, 3, 4, 5 and described variants thereof may be used with an apparatus for heating the smokable material 20 to volatilize at least one component of the smokable material 20. The apparatus may be to heat the smokable material 20 to volatilize the at least one component of the smokable material 20 without burning the smokable material 20. Any one of the article(s) 1, 2, 3, 4, 5 and such apparatus may be provided together as a system. The system may take the form of a kit, in which the article 1, 2, 3, 4, 5 is separate from the apparatus. Alternatively, the system may take the form of an assembly, in which the article 1, 2, 3, 4, 5 is combined with the apparatus.

The apparatus may comprise a magnetic field generator for generating a varying magnetic field for heating the heating material of the article 1, 2, 3, 4, 5, such as the foil 12 of the article 1 shown in FIGS. 1 and 2, or the wire(s) or track(s) of the articles 2, 3, 4, 5 shown in FIGS. 3 to 7. Such a magnetic field generator may comprise an electrical power source, an electromagnet, a device for passing a varying electrical current, such as an alternating current, through the coil, a controller, and a user interface for user-operation of the controller. The electrical power source may be a rechargeable battery, a non-rechargeable battery, a connection to a mains electricity supply, or the like.

The coil may take any suitable form, such as a helical coil of electrically-conductive material, such as copper. The magnetic field generator may comprise a magnetically permeable core around which the coil is wound, to concentrate the magnetic flux produced by the coil and make a more powerful magnetic field. The magnetically permeable core may be made of iron, for example. In some embodiments, the magnetically permeable core may extend only partially along the length of the coil, so as to concentrate the magnetic flux only in certain regions.

The device for passing a varying electrical current through the coil may be electrically connected between the electrical power source and the coil. The controller may be electrically connected to the electrical power source, and be communicatively connected to the device to control the device, so as to control the supply of electrical power from the electrical power source to the coil. In some embodiments, the controller may comprise an integrated circuit (IC), such as an IC on a printed circuit board (PCB). In other embodiments, the controller may take a different form. In some embodiments, the apparatus may have a single electrical or electronic component comprising the device and the controller. The controller may be operated by user-operation of the user interface, which may comprise a push-button, a toggle switch, a dial, a touchscreen, or the like. Operation of the user interface by a user may cause the controller to cause the device to apply an alternating electric current across the coil, so as to cause the coil to generate an alternating magnetic field.

The apparatus may have a recess or other interface for receiving the article 1, 2, 3, 4, 5, and the coil may be positioned relative to the recess or interface so that the varying or alternating magnetic field produced by the coil in use penetrates the recess or interface at a location corresponding to the heating material of the article 1, 2, 3, 4, 5 when the article 1, 2, 3, 4, 5 is in the recess or cooperating with the interface. When the heating material of the article 1, 2, 3, 4, 5 is an electrically-conductive material, this may cause the generation of one or more eddy currents in the heating material of the article 1, 2, 3, 4, 5. The flow of eddy currents against the electrical resistance of the heating material of the article 1, 2, 3, 4, 5 causes the heating material of the article 1, 2, 3, 4, 5 to be heated by Joule heating. When the heating material of the article 1, 2, 3, 4, 5 is a magnetic material, the orientation of magnetic dipoles in the heating material changes with the changing applied magnetic field, which causes heat to be generated in the heating material of the article 1, 2, 3, 4, 5 by magnetic hysteresis heating.

The apparatus may have a mechanism for compressing the article 1, 2, 3, 4, 5 when the article 1, 2, 3, 4, 5 is inserted in the recess or cooperating with the interface. Such compression of the article 1, 2, 3, 4, 5 can compress the smokable material 20, so as to increase the thermal conductivity of the smokable material 20. In other words, compression of the smokable material 20 can provide for higher heat transfer through the article 1, 2, 3, 4, 5.

The apparatus may have a temperature sensor for sensing a temperature of the recess, interface, or article 1, 2, 3, 4, 5 in use. The temperature sensor may be communicatively connected to the controller, so that the controller is able to monitor the temperature. In some embodiments, the temperature sensor may be arranged to take an optical temperature measurement of the recess, interface or article. In some embodiments, the article 1, 2, 3, 4, 5 may comprise a temperature detector, such as a resistance temperature detector (RTD), for detecting a temperature of the article 1, 2, 3, 4, 5. The article 1, 2, 3, 4, 5 may further comprise one or more terminals connected, such as electrically-connected, to the temperature detector. The terminal(s) may be for making connection, such as electrical connection, with a temperature monitor of the apparatus when the article 1, 2, 3, 4, 5 is in the recess or cooperating with the interface. The controller may comprise the temperature monitor. The temperature monitor of the apparatus may thus be able to determine a temperature of the article 1, 2, 3, 4, 5 during use of the article 1, 2, 3, 4, 5 with the apparatus.

In some embodiments, by providing that the heating material of the article 1, 2, 3, 4, 5 has a suitable resistance, the response of the heating material to a change in temperature could be sufficient to give information regarding temperature inside the article 1, 2, 3, 4, 5. The temperature sensor of the apparatus may then comprise a probe for analyzing the heating material.

On the basis of one or more signals received from the temperature sensor or temperature detector, the controller may cause the device to adjust a characteristic of the varying or alternating current passed through the coil as necessary, in order to ensure that the temperature remains within a predetermined temperature range. The characteristic may be, for example, amplitude or frequency. Within the predetermined temperature range, in use the smokable material 20 within an article 1, 2, 3, 4, 5 inserted in the recess or cooperating with the interface may be heated sufficiently to volatilize at least one component of the smokable material 20 without combusting the smokable material 20. In some embodiments, the temperature range is about 50° C. to about 250° C., such as between about 50° C. and about 150° C., between about 50° C. and about 120° C., between about 50° C. and about 100° C., between about 50° C. and about 80° C., or between about 60° C. and about 70° C. In some embodiments, the temperature range is between about 170° C. and about 220° C. In other embodiments, the temperature range may be other than this range. The apparatus may have a delivery device for delivering the volatilized component(s) of the smokable material 20 to a user.

The apparatus may define an air inlet that fluidly connects the recess or interface with an exterior of the apparatus. A user may be able to inhale the volatilize component(s) of the smokable material by drawing the volatilize component(s) through a channel, such as a channel of a mouthpiece of the apparatus. As the volatilized component(s) are removed from the article 1, 2, 3, 4, 5, air may be drawn into the recess or interface via the air inlet of the apparatus.

The apparatus may provide haptic feedback to a user. The feedback could indicate that heating of the susceptor is taking place, or be triggered by a timer to indicate that greater than a predetermined proportion of the original quantity of volatilizable component(s) of the smokable material 20 in the article 1, 2, 3, 4, 5 has/have been spent, or the like. The haptic feedback could be created by interaction of the susceptor with the coil (i.e. magnetic response), by interaction of an electrically-conductive element with the coil, by rotating an unbalanced motor, by repeatedly applying and removing a current across a piezoelectric element, or the like.

The apparatus may comprise more than one coil. The plurality of coils could be operated to provide progressive heating of the smokable material 20 in an article 1, 2, 3, 4, 5, and thereby progressive generation of vapor. For example, one coil may be able to heat a first region of the heating material relatively quickly to initialize volatilization of at least one component of the smokable material 20 and formation of vapor in a first region of the smokable material 20. Another coil may be able to heat a second region of the heating material relatively slowly to initialize volatilization of at least one component of the smokable material 20 and formation of vapor in a second region of the smokable material 20. Accordingly, vapor is able to be formed relatively rapidly for inhalation by a user, and vapor can continue to be formed thereafter for subsequent inhalation by the user even after the first region of the smokable material 20 may have ceased generating vapor. The initially-unheated second region of smokable material 20 could act as a filter, to reduce the temperature of created vapor or make the created vapor mild, during heating of the first region of smokable material 20.

In some embodiments, the heating material of the cover may comprise discontinuities or holes therein. Such discontinuities or holes may act as thermal breaks to control the degree to which different regions of the smokable material are heated in use. Areas of the heating material with discontinuities or holes therein may be heated to a lesser extent that areas without discontinuities or holes. This may help progressive heating of the smokable material, and thus progressive generation of vapor, to be achieved.

In each of the above described embodiments, the smokable material 20 comprises tobacco. However, in respective variations to each of these embodiments, the smokable material 20 may consist of tobacco, may consist substantially entirely of tobacco, may comprise tobacco and smokable material other than tobacco, may comprise smokable material other than tobacco, or may be free of tobacco. In some embodiments, the smokable material 20 may comprise a vapor or aerosol forming agent or a humectant, such as glycerol, propylene glycol, triactein, or diethylene glycol.

An article embodying the present disclosure may be a cartridge or a capsule, for example.

In each of the above described embodiments, the article 1, 2, 3, 4, 5 is a consumable article. Once all, or substantially all, of the volatilizable component(s) of the smokable material 20 in the article 1, 2, 3, 4, 5 has/have been spent, the user may remove the article 1, 2, 3, 4, 5 from the apparatus and dispose of the article 1, 2, 3, 4, 5. The user may subsequently re-use the apparatus with another of the articles 1, 2, 3, 4, 5. However, in other respective embodiments, the article 1, 2, 3, 4, 5 may be non-consumable, and the apparatus and the article 1, 2, 3, 4, 5 may be disposed of together once the volatilizable component(s) of the smokable material 20 has/have been spent.

In some embodiments, the apparatus discussed above is sold, supplied or otherwise provided separately from the articles 1, 2, 3, 4, 5 with which the apparatus is usable. However, in some embodiments, the apparatus and one or more of the articles 1, 2, 3, 4, 5 may be provided together as a system, such as a kit or an assembly, possibly with additional components, such as cleaning utensils.

Embodiments of the disclosure could be implemented in a system comprising any one of the articles discussed herein, and any one of the apparatuses discussed herein, wherein the apparatus itself further has heating material, such as in a susceptor, for heating by penetration with the varying magnetic field generated by the magnetic field generator. Heat generated in the heating material of the apparatus itself could be transferred to the article to further heat the smokable material therein.

In order to address various issues and advance the art, the entirety of this disclosure shows by way of illustration and example various embodiments in which the claimed invention may be practiced and which provide for superior articles for use with apparatus for heating smokable material to volatilize at least one component of the smokable material, superior methods of manufacturing such articles, and superior systems comprising such articles and such apparatus. The advantages and features of the disclosure are of a representative sample of embodiments only, and are not exhaustive and/or exclusive. They are presented only to assist in understanding and teach the claimed and otherwise disclosed features. It is to be understood that advantages, embodiments, examples, functions, features, structures and/or other aspects of the disclosure are not to be considered limitations on the disclosure as defined by the claims or limitations on equivalents to the claims, and that other embodiments may be utilized and modifications may be made without departing from the scope and/or spirit of the disclosure. Various embodiments may suitably comprise, consist of, or consist in essence of, various combinations of the disclosed elements, components, features, parts, steps, means, etc. The disclosure may include other inventions not presently claimed, but which may be claimed in future.

The invention claimed is:

1. An article for use with an apparatus for heating smokable material to volatilize at least one component of the smokable material, the article comprising:

smokable material; and a cover around the smokable material, wherein the cover defines an outer surface of the article and includes a closed circuit of heater material that is heatable by penetration with a varying magnetic field generator of the apparatus, and wherein the cover comprises:

a first wrapper that encircles the smokable material, the first wrapper comprising a sheet of material and a plurality of discrete portions of the heater material in or on the sheet of material that is heatable by penetration with a varying magnetic field, a second wrapper that encircles the first wrapper, wherein the first and second wrappers being configured such that when the article is used with the apparatus to volatilize at least one component of the smokable material, the second wrapper is between the magnetic field generator of the apparatus and the first wrapper, and an adhesive adhering free ends of the first wrapper to each other, and wherein the adhesive comprises heating material that is heatable by penetration with a varying magnetic field.

2. The article of claim 1, wherein the heater material is in contact with the smokable material.

3. The article of claim 1, wherein the first wrapper comprises a sheet of material, wherein the heater material is disposed on the sheet of material.

4. The article of claim 1, wherein the cover comprises a plurality of closed circuits of heater material that is heatable by penetration with a varying magnetic field.

5. The article of claim 1, wherein the heater material comprises a plurality of relatively closely-spaced portions of the heater material, and a plurality of less-closely-spaced portions of the heater material.

6. The article of claim 1, wherein the heater material comprises an electrically-conductive material or a magnetic material.

7. The article of claim 1, wherein the heater material comprises a metal or a metal alloy.

8. The article of claim 1, wherein the heater material comprises one or more materials selected from the group consisting of: aluminum, gold, iron, nickel, cobalt, conductive carbon, graphite, plain-carbon steel, stainless steel, ferritic stainless steel, copper, and bronze.

9. The article of claim 1, further comprising an annular mass of the smokable material, and a liner having a closed circuit of heater material that is heatable by penetration with a varying magnetic field, wherein the annular mass of the smokable material is disposed around the liner such that the liner defines an inner surface of the article.

10. The article of claim 1, wherein the heater material is a non-magnetic material.

11. The article of claim 1, wherein the closed circuit is disposed such that the closed circuit encircles the smokable material.

12. A method of manufacturing an article for use with an apparatus for heating smokable material to volatilize at least one component of the smokable material, the method comprising:

providing smokable material; and providing a cover around the smokable material such that the cover defines an outer surface of the article, wherein the cover comprises a closed circuit of heater material that is heatable by penetration with a varying magnetic field of the apparatus, wherein providing the cover comprises:

providing a first wrapper comprising a sheet of material and plurality of discrete portions of the heater material in or on the sheet of material that is heatable by penetration with a varying magnetic field around the smokable material, providing a second wrapper around the first wrapper, wherein the first and second wrappers being configured such that when the article is used with the apparatus to volatilize at least one component of the smokable material, the second wrapper is between the magnetic field generator of the apparatus and the first wrapper, and adhering free ends of the first wrapper together using adhesive, wherein the adhesive comprises heating material that is heatable by penetration with a varying magnetic field.

13. A system, comprising:

an apparatus comprising a magnetic field generator, the apparatus configured to heat smokable material and volatilize at least one component of the smokable material; and an article for use with the apparatus, wherein the article comprises smokable material and a cover around the smokable material, wherein the cover defines an outer surface of the article and comprises a closed circuit of heater material that is heatable by penetration with a varying magnetic field, and wherein the cover comprises:

a first wrapper that encircles the smokable material, the first wrapper comprising a sheet of material and a plurality of discrete portions of the heater material in or on the sheet of material that is heatable by penetration with a varying magnetic field, a second wrapper that encircles the first wrapper, wherein the first and second wrappers being configured such that when the article is used with the apparatus to volatilize at least one component of the smokable material, the second wrapper is between the magnetic field generator of the apparatus and the first wrapper, and an adhesive adhering free ends of the first wrapper to each other, wherein the adhesive comprises heating material that is heatable by penetration with a varying magnetic field.

14. The system of claim 13, wherein the apparatus comprises an interface configured to cooperate with the article, and wherein the magnetic field generator is configured to generate a varying magnetic field that penetrates the heater material when the article cooperates with the interface.

* * * * *